(12) United States Patent
Tooher et al.

(10) Patent No.: US 12,256,333 B2
(45) Date of Patent: Mar. 18, 2025

(54) WIRELESS TRANSMIT RECEIVE UNIT (WTRU) REACHABILITY

(71) Applicant: InterDigital Patent Holdings, Inc., Wilmington, DE (US)

(72) Inventors: J. Patrick Tooher, Montreal (CA); Paul Marinier, Brossard (CA); Ghyslain Pelletier, Montreal (CA); Faris Alfarhan, Montreal (CA); Aata El Hamss, Laval (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 18/234,005

(22) Filed: Aug. 15, 2023

(65) Prior Publication Data
US 2023/0388931 A1    Nov. 30, 2023

Related U.S. Application Data

(63) Continuation of application No. 17/052,328, filed as application No. PCT/US2019/030815 on May 6, 2019, now abandoned.

(Continued)

(51) Int. Cl.
*H04W 52/02* (2009.01)
*H04W 68/00* (2009.01)
(Continued)

(52) U.S. Cl.
CPC ..... *H04W 52/0274* (2013.01); *H04W 68/005* (2013.01); *H04W 72/1273* (2013.01); *H04W 72/23* (2023.01); *H04W 76/28* (2018.02)

(58) Field of Classification Search
None
See application file for complete search history.

(56) References Cited

U.S. PATENT DOCUMENTS 9,332,456 B2    5/2016    Heo et al.
2015/0003311 A1    1/2015    Feuersaenger et al.
(Continued)

FOREIGN PATENT DOCUMENTS

CN    104205993 A    12/2014
CN    104350795 A    2/2015
(Continued)

OTHER PUBLICATIONS

RP-172021, , "Revised SID on NR-based Access to Unlicensed Spectrum", Qualcomm Incorporated, 3GPP TSG RAN Meeting #77, Sapporo, Japan, Sep. 11-14, 2017, 5 pages.

(Continued)

*Primary Examiner* — Alex Skripnikov
(74) *Attorney, Agent, or Firm* — Condo Roccia Koptiw LLP

(57) ABSTRACT

A wireless transmit/receive unit (WTRU) may receive/transmit data by employing a discontinuous reception cycle, which may include an awake state and a sleep state. For example, while in an awake state, a WTRU may monitor a PDCCH for a subset of time instances. During the remaining time instances, the WTRU may enter a sleep state, in which the WTRU may switch its receiving circuitry off (e.g., to reduce power consumption). A WTRU may receive (e.g., may expect to receive) one or more transmissions, during an awake state, before entering a sleep state. The durations of an awake state and/or the durations of subsequent sleep states may be determined based on whether the WTRU receives a transmission during the awake state and/or what the transmission was for. The WTRU may modify the value of a sleep state timer based on previous sleep state and/or awake state timer values.

20 Claims, 6 Drawing Sheets

Related U.S. Application Data

(60) Provisional application No. 62/787,960, filed on Jan. 3, 2019, provisional application No. 62/752,119, filed on Oct. 29, 2018, provisional application No. 62/715,390, filed on Aug. 7, 2018, provisional application No. 62/668,571, filed on May 8, 2018.

(51) Int. Cl.
*H04W 72/1273* (2023.01)
*H04W 72/23* (2023.01)
*H04W 76/28* (2018.01)

(56) References Cited

U.S. PATENT DOCUMENTS

| | | |
|---|---|---|
| 2015/0173039 A1 | 6/2015 | Rune et al. |
| 2016/0119970 A1 | 4/2016 | Lee et al. |
| 2016/0242231 A1 | 8/2016 | Vajapeyam et al. |
| 2016/0262118 A1 | 9/2016 | Kim et al. |
| 2017/0339641 A1 | 11/2017 | Nigam et al. |
| 2017/0359850 A1 | 12/2017 | Loehr et al. |
| 2019/0239189 A1 | 8/2019 | Hwang et al. |

FOREIGN PATENT DOCUMENTS

| | | |
|---|---|---|
| CN | 104812032 A | 7/2015 |
| CN | 105340341 A | 2/2016 |
| CN | 107197508 A | 9/2017 |
| EP | 3079436 A1 | 10/2016 |
| WO | 2015002578 A1 | 1/2015 |
| WO | 2016007472 A1 | 1/2016 |
| WO | 2016072787 A1 | 5/2016 |
| WO | 2016146147 A1 | 9/2016 |
| WO | 2018031327 A1 | 2/2018 |
| WO | 2018174805 A1 | 9/2018 |

OTHER PUBLICATIONS

TR 36.889 V13.0.0, , "3rd Generation Partnership Project (3GPP)", Technical Specification Group Radio Access Network, Study on Licensed-Assisted Access to Unlicensed Spectrum, (Release 13), Jun. 2015, pp. 1-87.

TS 38.213 V15.0.0, , "3rd Generation Partnership Project (3GPP)", Technical Specification Group Radio Access Network, NR, Physical Layer Procedures for Control (Release 15), Dec. 2017, pp. 1-56.

TS 38.304 V15.0.0, , "3rd Generation Partnership Project (3GPP)", 3rd Generation Partnership Project; Technical Specification Group Radio Access Network; NR; User Equipment (UE) procedures in Idle mode and RRC Inactive state (Release 15), Jun. 2018.

TS 38.321 V15.1.0, , "3rd Generation Partnership Project (3GPP)", Technical Specification Group Radio Access Network, NR, Medium Access Control (MAC) Protocol Specification (Release 15), Mar. 2018, pp. 1-67.

Wigard, et al., "On the user Performance of LTE UE Power Savings Schemes with Discontinuous Reception in LTE", IEEE International Conference on Communications Workshops, Jun. 14-18, 2009, 5 pages.

Zhou, et al., "Performance Analysis of Power Saving Mechanism with Adjustable DRX Cycles in 3GPP LTE", IEEE 68th Vehicular Technology Conference, Sep. 21-24, 2008, pp. 1-5.

3rd Generation Partnership Project (3GPP), R2-1809611, "Discontinuous reception in NR-Unlicensed", InterDigital, Inc., 3GPP TSG-RAN WG2 NR AH1807 Meeting, Montreal, Canada, Jul. 2-6, 2018, 3 pages.

3rd Generation Partnership Project (3GPP), R2-1811452, (Resubmission of R2-1809611) "DRX in NR-U", InterDigital, Inc., 3GPP TSG-RAN WG2 Meeting #103, Gothenburg, Sweden, Aug. 20-24, 2018, 3 pages.

3rd Generation Partnership Project (3GPP), R2-1811457, "Paging procedure in NR-U", InterDigital, Inc., 3GPP TSG-RAN WG2 Meeting #103, Gothenburg, Sweden, Aug. 20-24, 2018, 3 pages.

3rd Generation Partnership Project (3GPP), R2-1814006, (Revision of R2-1811457) "Paging procedure in NR-U", InterDigital, Inc., 3GPP TSG-RAN WG2 Meeting #103bis, Chengdu, China, Oct. 8-12, 2018, 3 pages.

3rd Generation Partnership Project (3GPP), R2-1814022, (Revision of R2-1811452) "DRX in NR-U", InterDigital, Inc., 3GPP TSG-RAN WG2 Meeting #103bis, Chengdu, China, Oct. 8-12, 2018, 4 pages.

3rd Generation Partnership Project (3GPP), R2-1816777, "TP for Paging in NR-U", InterDigital, Inc., 3GPP TSG-RAN WG2 Meeting # 103, Spokane, U.S.A., Nov. 12-16, 2018, 3 pages.

3rd Generation Partnership Project (3GPP), R2-1816780, "TP for DRX in NR-U", InterDigital, Inc., 3GPP TSG-RAN WG2 Meeting #104, Spokane, U.S.A., Nov. 12-16, 2018, 3 pages.

3rd Generation Partnership Project (3GPP), R2-1901455, Revision of R2-1816777, "Paging in NR-U", InterDigital, Inc., 3GPP TSG-RAN WG2 Meeting # 105, Athens, Greece, Feb. 25-Mar. 1, 2019, 3 pages.

3rd Generation Partnership Project (3GPP), R2-1903553, "Paging in NR-U", InterDigital, Inc., 3GPP TSG-RAN WG2 Meeting #105bis, Xi'An, China, Apr. 8-12, 2019, 3 pages.

3rd Generation Partnership Project (3GPP), R2-1906401, (Revision of R1-1903553) "Paging in NR-U", InterDigital, Inc., 3GPP TSG-RAN WG2 Meeting #106, Reno, U.S.A., May 13-17, 2019, 3 pages.

3rd Generation Partnership Project (3GPP), R2-1909602, "Paging in NR-U", InterDigital, Inc., 3GPP TSG-RAN WG2 Meeting #107, Prague, Czech Republic, Aug. 26-30, 2019, 3 pages.

3rd Generation Partnership Project (3GPP), R2-1912887, (Revision of R2-1909602) "Paging in NR-U", InterDigital, Inc., 3GPP RAN WG2 Meeting #107bis, Chongqing, China, Oct. 14-18, 2019, 3 pages.

3rd Generation Partnership Project (3GPP), R2-1914881, (Revision of R2-1912887) "Paging in NR-U", InterDigital, Inc., 3GPP RAN WG2 Meeting #108, Reno, U.S.A., Nov. 18-22, 2019, 4 pages.

CN 107197508 (A), in related Chinese Notice of Allowance dated May 29, 2024.

WIRELESS TRANSMIT RECEIVE UNIT (WTRU) REACHABILITY

CROSS-REFERENCE TO RELATED APPLICATIONS

This application is a continuation of U.S. patent application Ser. No. 17/052,328, filed Nov. 2, 2020, which is the National Stage Entry under 35 U.S.C. § 371 of Patent Cooperation Treaty Application No. PCT/US2019/030815, filed May 6, 2019, which claims the benefit of U.S. Provisional Application Ser. No. 62/668,571 filed May 8, 2018, U.S. Provisional Application Ser. No. 62/715,390 filed Aug. 7, 2018, U.S. Provisional Application Ser. No. 62/752,119 filed Oct. 29, 2018, and U.S. Provisional Application Ser. No. 62/787,960 filed Jan. 3, 2019, the contents of which are incorporated by reference herein.

BACKGROUND

Operation in an unlicensed frequency band may be subject to limits. For example, in an unlicensed transmission, there may be limits on one or more of transmit power, radio frequency (RF) output power, power density given by the mean Equivalent Isotropically Radiated Power (EIRP), the mean EIRP density at the highest power level, and/or the like. Operation in an unlicensed frequency band may further be subject to requirements on out of band emissions of the transmitter, which may be specific to bands and/or geographical locations.

Operation in an unlicensed frequency band may be subject to requirements on the Nominal Channel Bandwidth (NCB) and the Occupied Channel Bandwidth (OCB) that are defined for the unlicensed spectrum (e.g., the unlicensed spectrum in a 5 GHz region). The NCB may correspond to the widest band of frequencies. The NCB may include the guard bands assigned to a channel. For example, the guard band may be approximately 5 MHz (e.g., may be at least 5 MHz at all times). The OCB may be the bandwidth containing the large majority of the power of the signal (e.g., on order of approximately 99% of signal power). The OCB may correspond to approximately 80% to 100% of the declared NCB. During an established communication session for example, a device may operate temporarily in a mode where the OCB of the device may be reduced. For example, the OCB may be reduced to approximately 40% of its NCB. In many scenarios, the OCB of the device may have a minimum bandwidth of approximately 4 MHz.

Listen-Before-Talk (LBT) may be performed to facilitate channel access in an unlicensed frequency band. LBT may be performed independently of whether or not the channel is occupied.

LBT may be implemented using LBT frame-based systems. An LBT system may be characterized by one or more of the following. An LBT system may be characterized by a Clear Channel Assessment (CCA) time. For example, 20 μs may be a typical CCA time. An LBT system may be characterized by a Channel Occupancy time. For example, a typical minimum channel occupancy time may be approximately 1 ms and a typical maximum channel occupancy time may be approximately of 10 ms. An LBT system may be characterized by an idle period. For example, a typical idle period between transmissions may be approximately minimum 5% of channel occupancy time. An LBT system may be characterized by a fixed frame period. For example, the fixed frame period may correspond to the channel occupancy time and the idle period. An LBT system may be characterized by a short control signaling transmission time. For example, a typical control signaling transmission time may be associated with a maximum duty cycle of 5% within an observation period of 50 ms. An LBT system may be characterized by a CCA energy detection threshold.

In a wireless communication system(s) (e.g., a new radio (NR) system), discontinuous reception (DRX) may reduce wireless transmit/receive unit (WTRU) power consumption. For example, when a WTRU is in connected mode DRX, the WTRU may be configured with a DRX cycle. When the WTRU is in the DRX cycle, the WTRU may monitor the physical downlink control channel (PDCCH) for a subset of time instances, and during the remaining time instances, the WTRU may sleep (e.g., not monitor) during not monitoring periods. To save power, the WTRU may operate with the receiver circuitry switched off during periods where it is not required to monitor the control channel. When the WTRU receives scheduling information in its PDCCH during a monitoring portion of the cycle, the WTRU may continue to monitor the PDCCH until, for example, the WTRU determines that no scheduling is expected. The sleep duration may be directly proportional to the power savings. For example, the longer the sleep duration, the larger the reduction in WTRU power consumption. Scheduling restrictions may apply and/or may affect efficiency.

SUMMARY

Systems, methods, and/or instrumentalities are disclosed for determining times during which a wireless transmit/receive unit (WTRU) should monitor for signaling and/or periods during which no signaling is expected (e.g., when the WTRU can sleep). The systems and techniques described herein may be used by a WTRU to implement discontinuous reception (DRX) operation (e.g., either in connected and/or idle modes), determine when to expect control signaling, determine when to expect paging signaling, and/or the like. The techniques described herein may be used when the WTRU is operating on an unlicensed and/or otherwise contentious channel.

A WTRU may be configured to determine timing associated with a monitoring period (e.g., a start time of a subsequent monitoring period or a second monitoring period). For example, a WTRU may be configured to determine timing associated with a monitoring period based on a signal(s) received during a previous monitoring period (e.g., a first monitoring period). A WTRU may monitor a channel (e.g., an unlicensed channel) for a signal(s) associated with a transmission during a monitoring period (e.g., a first monitoring period). Based on the signal(s) received during the monitoring period (e.g., the first monitoring period), the WTRU may determine a time (e.g., a start time) of a subsequent monitoring period (e.g., a second monitoring period). For example, the WTRU may monitor for a signal(s) during the monitoring period for a signal for an indication that the channel has been acquired (e.g., a channel acquisition indication and/or signal) and/or a signal for a message that includes scheduling information for a transmission to and/or from the WTRU on the channel. A reference signal (RS) may be an example signal for the indication that the channel has been acquired. Downlink control information may be an example signal for the indication that the channel has been acquired.

The WTRU may determine a subsequent monitoring period (e.g., a second monitoring period) based on the signals received during the previous monitoring period (e.g., the first monitoring period). The WTRU may determine that the subsequent monitoring period (e.g., the second monitoring period) may occur at a first time based on receiving the signal that indicates the channel has been acquired during the first monitoring period. The WTRU may determine that the subsequent monitoring period (e.g., the second monitoring period) may occur at a second time based on not receiving the signal that indicates the channel acquisition during the first monitoring period. The WTRU may send or receive a transmission on the channel based on receiving the signal for the channel acquisition and the message that includes scheduling information.

The WTRU may determine a duration (e.g., a minimum duration) of the second monitoring period to a first duration based on receiving the signal for channel acquisition but not receiving the signal for the message including scheduling information for the transmission to and/or from the WTRU on the channel during the first monitoring period. The WTRU may determine the duration (e.g., the minimum duration) of the second monitoring period to the second duration based on not receiving the signal for channel acquisition and not receiving the signal for the message including scheduling information for the transmission to and/or from the WTRU on the channel during the first monitoring period. The first duration may be longer than the second duration.

In examples, the first and the second monitoring periods described herein may correspond to active periods of DRX cycles. For example, the first and the second monitoring periods described herein may correspond to on durations of a DRX cycle. A time between an end of the first monitoring period and a start of the second monitoring period may correspond to a sleep period of the DRX cycles. The WTRU may determine the first time the WTRU receiving the channel acquisition signal during the first monitoring period. For example, the WTRU may determine the first time the WTRU receiving the channel acquisition signal based on a long DRX cycle configuration. The WTRU may determine the second time the WTRU not receiving the channel acquisition signal during the first monitoring period. For example, the WTRU may determine the second time the WTRU not receiving the channel acquisition signal during based on a short DRX cycle configuration.

In examples, the first and the second monitoring periods described herein may correspond to a first paging occasion and a second paging occasion, respectively.

The WTRU may consider an indication (e.g., in the channel acquisition signal) that the WTRU may go to sleep until a start of the second monitoring period based on the WTRU receiving the channel acquisition signal (e.g., but not receiving the signal for the message for scheduling information for the transmission) during the first monitoring period.

A WTRU may receive/transmit data by employing a discontinuous reception cycle, for example for use in operation in an unlicensed band, DRX operation may include an awake state and a sleep state. For example, while in an awake state, a WTRU may monitor a physical downlink control channel (PDCCH) for a subset of time instances. During the remaining time instances, the WTRU may enter a sleep state, in which the WTRU may not be required to monitor the PDCCH. During the sleep period, the WTRU may switch off receiving circuitry to reduce power consumption. A WTRU may receive (e.g., may expect to receive) one or more transmissions during an awake state. For example, a WTRU may receive one or more transmissions during an awake state before entering a sleep state. The durations of an awake state and/or the durations of subsequent sleep states may be determined based on whether the WTRU receives a transmission during the awake state and/or what the transmission was for. The WTRU may modify the value of a sleep state timer based on one or more of previous sleep state, awake state timer values, or received transmission(s) during the awake state. The WTRU may receive an indication for an aperiodic paging occasion (PO) timing during a PO.

The DRX operation may be used to support operation in an unlicensed band. For example, DRX operation may be defined such that Listen-Before-Talk (LBT) is performed as part of or in conjunction with DRX operation. DRX timing and reception rules may be implemented such that the WTRU is able to differentiate between scenarios where the WTRU was not scheduled via the PDCCH or other control channel (e.g., because the network did not have a transmission for the WTRU) versus when the WTRU was not sent a transmission due to lack of channel acquisition by the network (e.g., despite having a transmission for the WTRU). The rules may be defined to balance between WTRU reachability/latency and power savings.

The DRX rules and configurations may be applicable to New Radio (NR) operation in an unlicensed band (e.g., 5G operation in an unlicensed band).

A WTRU may determine one or more parameters of a current and/or upcoming DRX cycle based on the presence and/or absence of a signal during a current awake period. Based on the determination, the WTRU may provide more opportunities to a network to acquire a channel to reach the WTRU.

For example, one or more of the following may be performed. The WTRU may be configured with multiple DRX durations. The WTRU may wake up from a DRX cycle at expiration of a first timer. The WTRU may monitor a presence of a signal. For example, the WTRU may monitor whether a PDCCH transmission to assign resources or page a WTRU and/or a transmission indicating the cell acquired the unlicensed channel. If the WTRU receives a signal indicating that a channel has been acquired and no other transmission, the WTRU may return to DRX, for example using a first DRX duration. If the WTRU does not receive a (e.g., any) transmission from the cell, the WTRU may return to DRX, for example using a second DRX duration.

A WTRU may determine one or more parameters of a current and/or upcoming DRX cycle based on the reception, or lack thereof, of a signal in a previous or current awake period.

A WTRU may receive an indication to enter (e.g., immediately enter) DRX state (e.g., at conclusion of channel occupancy (COT)).

A WTRU may determine the timing of an aperiodic PF based on the reception, or lack thereof, of a signal during a previous paging frame (PF).

A WTRU may receive an indication in a PF of the timing of an upcoming aperiodic PF.

Paging occasion(s) and/or paging frame(s) (e.g., conditional paging occasion(s) and/or paging frame(s)) may be triggered. The activation or deactivation of a conditional paging occasion (PO) and/or a conditional PF may be based on one or more of the following. The activation or deactivation of a conditional PO and/or a conditional PF may be based on reception of a signal or lack of reception a signal in a (e.g., previous and/or associated) PO and/or PF. The activation or deactivation of a conditional PO and/or a conditional PF may be based on reception of a signal prior to the conditional PO and/or PF. The activation or deactivation of a conditional PO and/or a conditional PF may be based on one or more measurements. The activation or deactivation of a conditional PO and/or a conditional PF may be based on one or more network indications. The activation or deactivation of a conditional PO and/or a conditional PF may be based on a time. The activation or deactivation of a conditional PO and/or a conditional PF may be based on a WTRU state.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
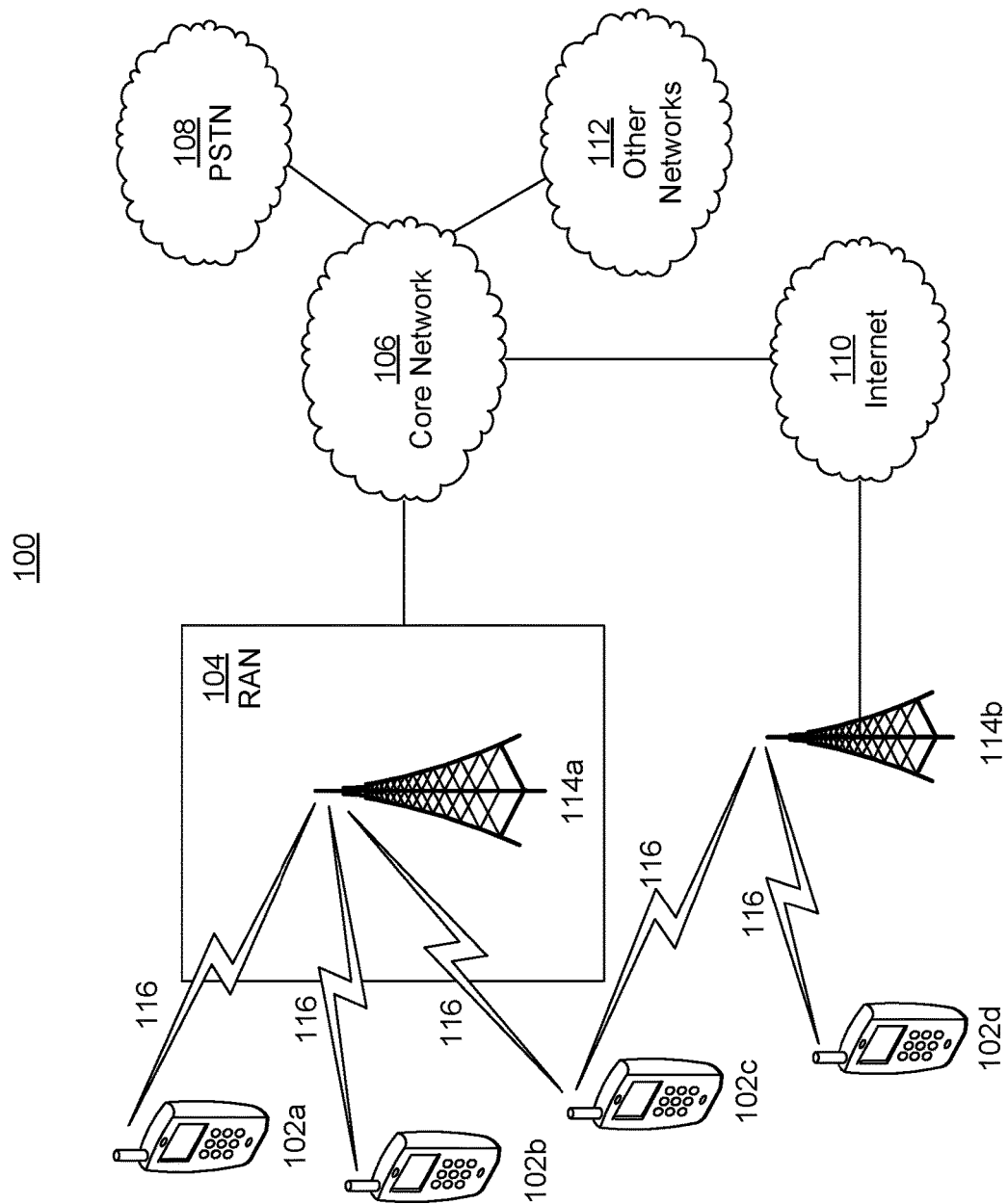
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
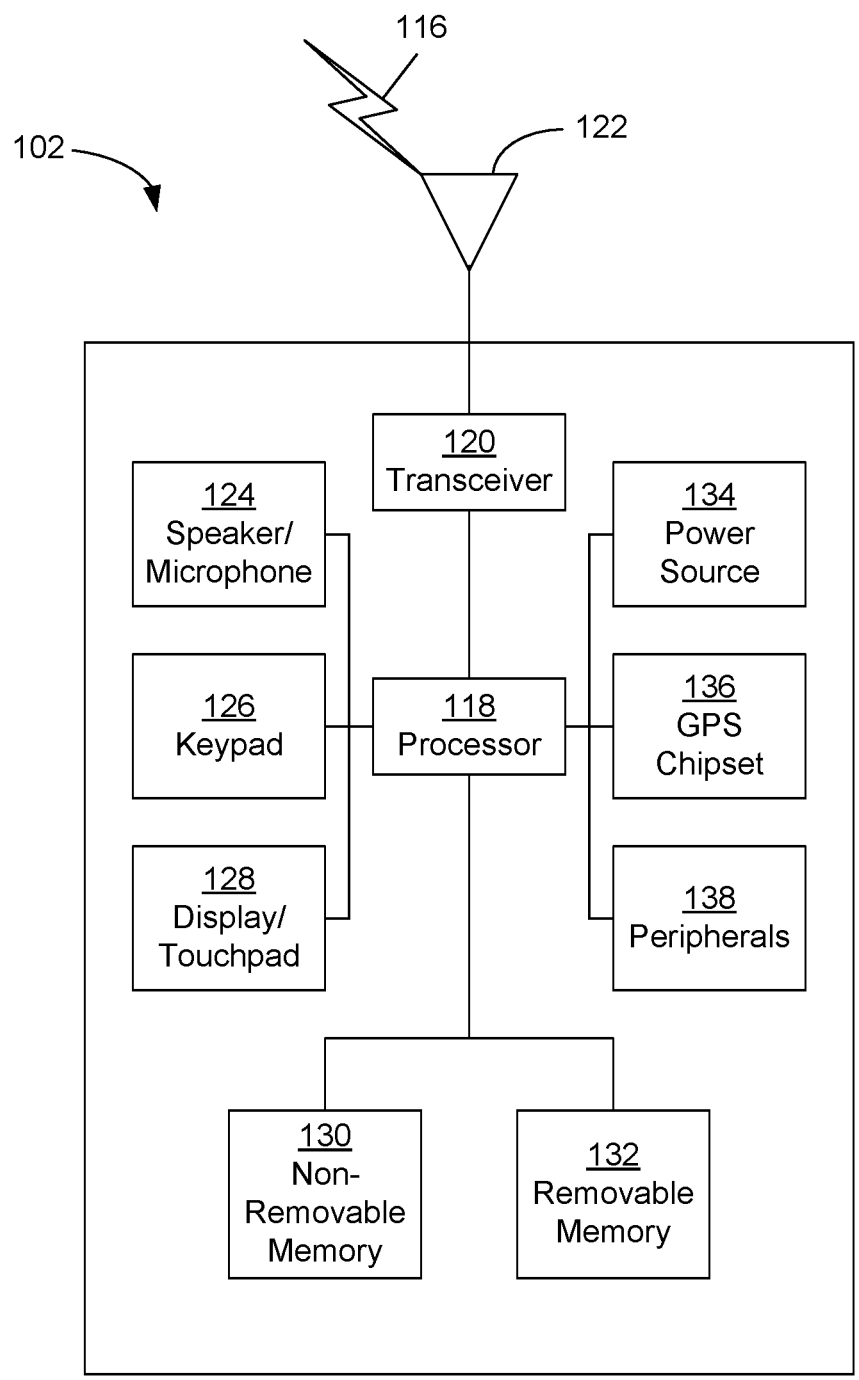
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor, a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
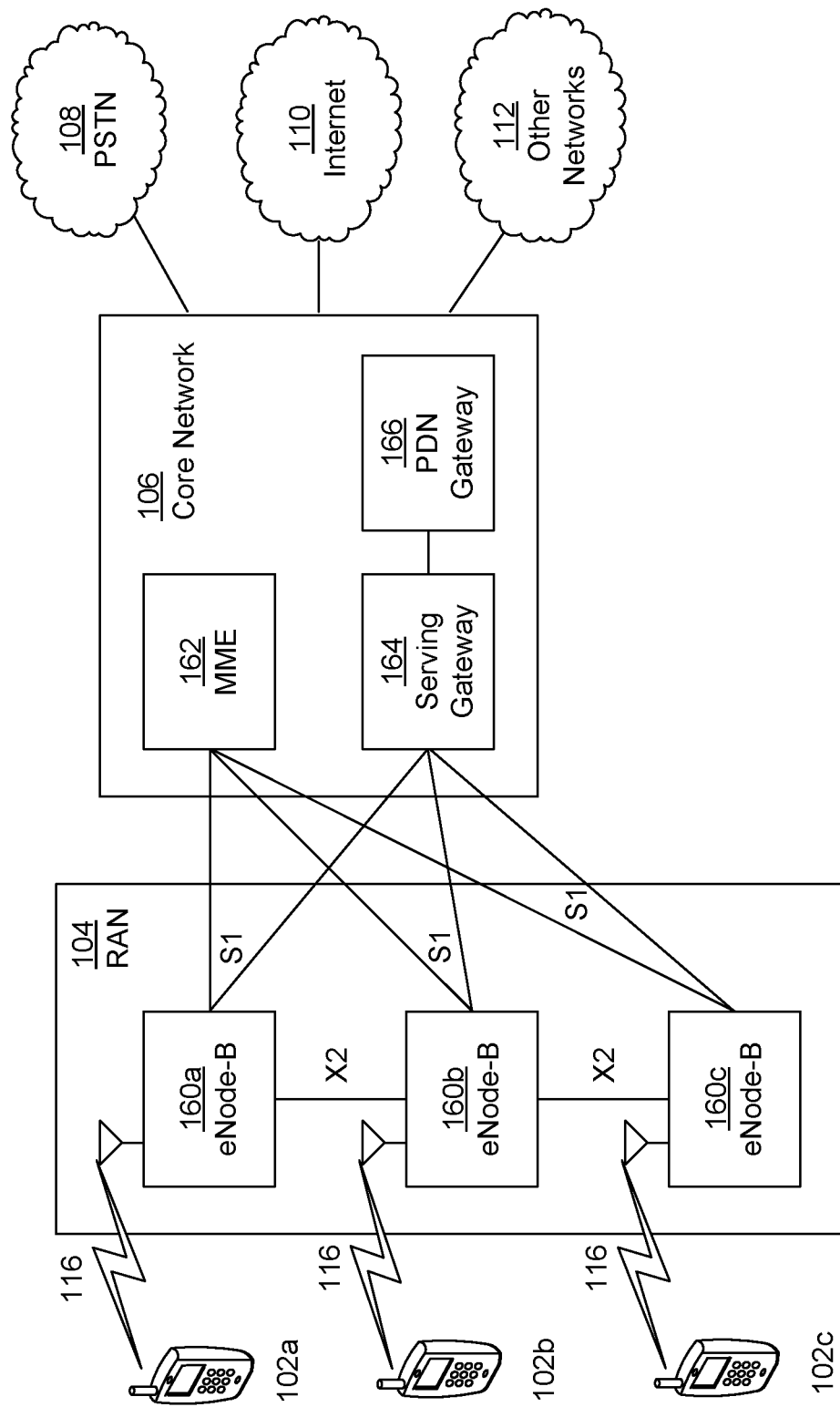
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
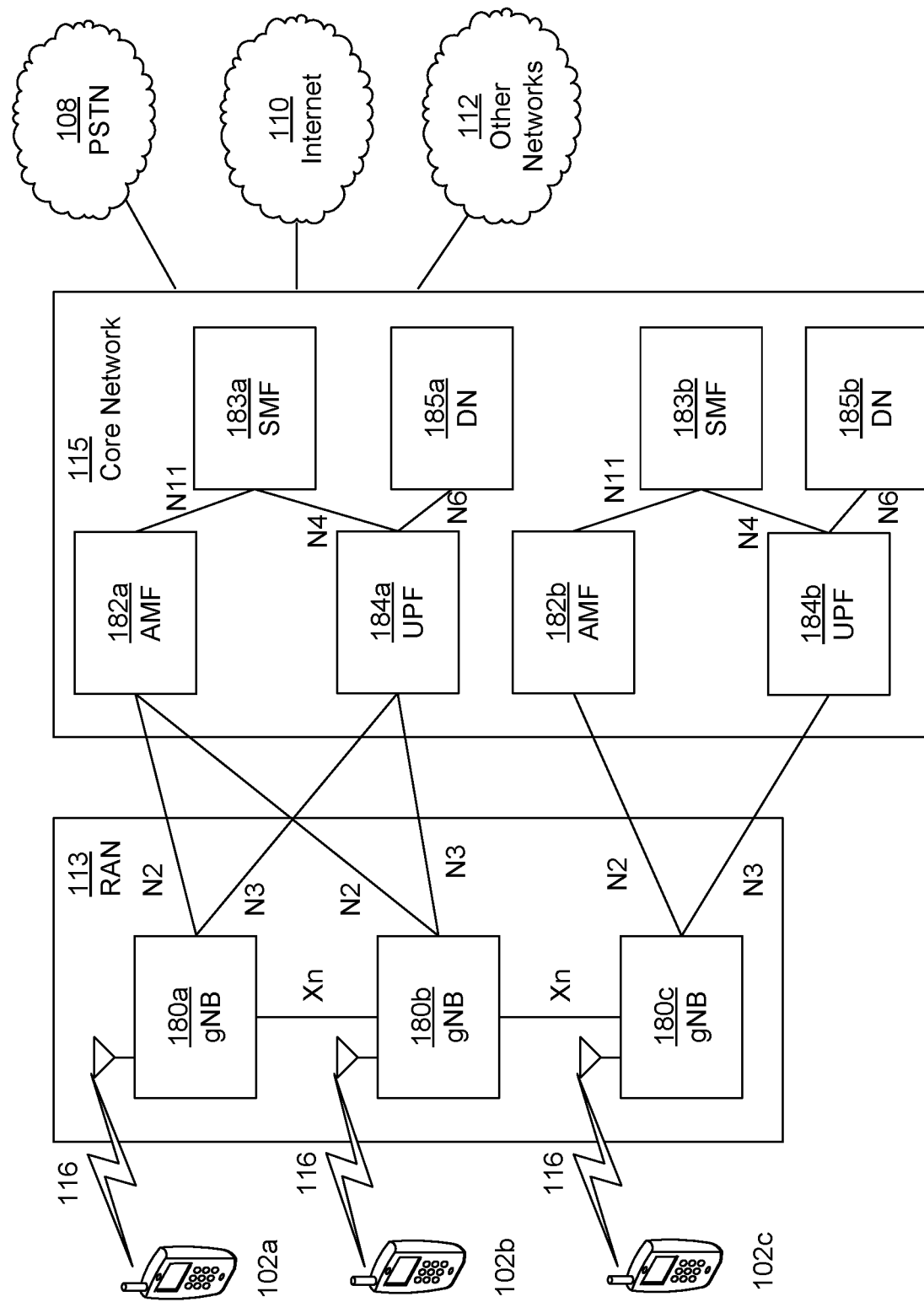
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For load-based systems (e.g., systems where the transmit/receive structures may not be fixed in time), Listen-Before-Talk (LBT) may be characterized by a number, N, which may correspond to the number of clear idle slots in an extended Clear Channel Assessment (CCA) (e.g., instead of and/or in addition to corresponding to a fixed frame period). For example, N may be randomly selected from a range.

A WTRU may be configured to operate in multiple types of radio access deployments described herein. A WTRU may be configured to implement a standalone operation (e.g., a variant standalone operation). For example, a WTRU may be configured to implement a variant of standalone New Radio (NR)-based operation. A WTRU may be configured to implement a variant of dual connectivity (DC) operations. For example, a variant of DC operations may include a dual connectivity (EN-DC) with one or more carriers operating according to the LTE radio access technology (RAT) (e.g., with a connectivity corresponding to an NR RAT). A WTRU may be configured to implement a NR DC with at least two sets of one or more carriers operating according to the NR RAT. A WTRU may be configured to implement different variations of carrier aggregation (CA). For example, CA may include different combinations of zero or more carriers of each of LTE and NR RATs.

One or more of the following functionalities may be utilized for LTE license assisted access (LAA) systems. LBT/CCA functionalities may be utilized for LAA systems. Discontinuous transmission on a carrier with limited maximum transmission duration functionality may be utilized for LAA systems. Carrier selection functionality may be utilized for LAA systems. Transmit power control functionality may be utilized for LAA systems.

LBT and/or CM may be performed by a WTRU in LAA systems. A WTRU may use LBT to perform a CCA check. For example, a WTRU may use LBT to perform a CCA check before using a channel. The CCA may use energy detection to determine the presence or absence of other signals on a channel, which may indicate that a channel is either occupied or clear, respectively. Regulations may define the usage of LBT in unlicensed bands. Apart from regulatory requirements, carrier sensing via LBT may provide for equitable sharing of the unlicensed spectrum and/or may be considered a large-scale framework (e.g., a single global solution framework) for operation in the unlicensed.

Discontinuous transmission (DTX) may limit the maximum transmission duration and DTX may be performed on a carrier. In unlicensed spectrum, channel availability may not be guaranteed. Certain regions (e.g., Europe and/or Japan) may not allow for continuous transmission and/or may impose limits on transmissions (e.g., limits on the maximum duration of a transmission burst) in an unlicensed spectrum. DTX may limit the maximum transmission duration and may be performed in LM systems.

Carrier selection may be performed by LAA nodes such that carriers with low interference are selected. If, for example, the bandwidth available for unlicensed spectrum is large, carrier selection may allow for LAA nodes to select the carriers with low interference and/or may allow for co-existence with other unlicensed spectrum deployments.

A Transmit Power Control (TPC) may be regulated in some regions. For example, a transmitting device (e.g., WTRU) may be regulated such that the transmit power is proportionally reduced (e.g., reduced by 3 dB or 6 dB) when compared to the maximum nominal transmit power.

Radio resource management (RRM) measurements, which may include cell identification, may enable mobility between secondary cells (SCells) and/or may allow for robust operation in the unlicensed band.

Channel-state information (CSI) measurements, which may include channel and/or interference measurements, may be performed by a WTRU. For example, a WTRU operating in an unlicensed carrier may support frequency/time estimation and/or synchronization. If a WTRU supports frequency/time estimation and/or synchronization, RRM measurements may be enabled and/or the reception of information on the unlicensed band may be successful.

A WTRU (e.g., a WTRU in NR) may operate using bandwidth parts (BWPs) in a carrier. For example, the WTRU may access the cell using an initial BWP. The WTRU may be configured (e.g., may then be configured)

with a set of BWPs to continue operation. The WTRU may have an active BWP. For example, the WTRU may have an active BWP at any given moment. A BWP (e.g., each BWP) may be configured with one or more (e.g., a set of) control resource sets (CORESETs) within which a WTRU may blind decode physical downlink control channel (PDCCH) candidates (e.g., for scheduling information, among other things).

A wireless communication system(s) (e.g., NR) may support variable transmission durations and/or feedback timing. For example, if a wireless communication system supports variable transmission durations, a physical downlink shared channel (PDSCH) and/or a physical uplink shared channel (PUSCH) transmission may occupy a subset of symbols (e.g., a contiguous subset of symbols) within a slot. For example, if a wireless communication system supports variable feedback timing, the DCI for a downlink (DL) assignment may include an indication for the timing of the feedback for the WTRU. For example, the DCI may indicate a specific PUCCH resource to be used for the feedback.

A wireless communication system(s) (e.g., a NR communication system) may support one or more types of (e.g., two types of) PUCCH resources. For example, a wireless communication system (e.g., a NR communication system) may support PUCCH (e.g., a short PUCCH and/or a long PUCCH). The short PUCCH may be transmitted using 1 or 2 OFDM symbols, while the long PUCCH may be transmitted using up to 14 OFDM symbols. Each PUCCH type may use one or more formats (e.g., multiple formats). For example, the format used may be based on the type and/or size of corresponding payload.

In a wireless communication system(s) (e.g., a NR communication system), discontinuous reception (DRX) may be used to reduce WTRU power consumption. For example, when a WTRU is in connected mode DRX, the WTRU may be configured with a DRX cycle. When the WTRU is in the DRX cycle, the WTRU may monitor the PDCCH for a subset of time instances, and during the remaining time instances, the WTRU may sleep (e.g., may not monitor) with the receiver circuitry switched off. A WTRU may receive scheduling information in its PDCCH during a monitoring portion of the cycle. Upon receiving the scheduling information, the WTRU may continue to monitor the PDCCH. For example, the WTRU may continue to monitor the PDCCH for further scheduling information. The WTRU may return to the sleep period after some period of inactivity when no PDCCH transmission scheduling additional new data have been received.

The sleep duration may be proportional (e.g., directly proportional) to the power savings. For example, the longer the sleep duration, the larger the reduction in WTRU power consumption. One or more scheduling restrictions may apply and/or may affect efficiency.

A WTRU may be in an IDLE mode. When a WTRU is in an IDLE mode, the WTRU may be configured with a DRX cycle. A WTRU may monitor for paging information. Upon receiving the paging information, a DRX cycle may allow for reduced power consumption of the WTRU. A WTRU may wake up from a paging occasion (PO). The WTRU may determine whether the WTRU has been paged. Upon waking up from a PO and determining that the WTRU has not been paged, the WTRU may return to sleep.

One or more operational techniques (e.g., NR-based operational techniques) may include initial access, scheduling/HARQ, and/or mobility. The one or more operational techniques (e.g., NR-based operational techniques) may be used in an unlicensed spectrum and/or for coexistence with LTE-LAA and other RATs. Operational techniques may include NR-based LAA cell connection with an LTE or NR anchor cell and/or NR-based cells standalone operation in an unlicensed spectrum.

Transmissions in an unlicensed spectrum (e.g., NR transmissions in an unlicensed spectrum) may be preceded by a channel acquisition. For example, a successful LBT may be performed before a network transmits PDCCH information for a data transmission, paging indications, and/or system information transmissions. To reduce power consumption, a WTRU may not continually monitor a PDCCH. For example, to reduce power consumption, a WTRU may not monitor PDCCHs at all times.

A WTRU may enter a low activity mode where the WTRU may monitor fewer PDCCH occasions and reduce power consumption. Upon entering a low activity mode, the WTRU may differentiate between when the WTRU was not reached on purpose (e.g., the network did not have a transmission for the WTRU) and when the WTRU was not reached due to lack of channel acquisition by the network (e.g., despite having a transmission for the WTRU). If, for example, the WTRU behaves similarly (e.g., the same) in both scenarios, latency may become prohibitive and/or a serviceable WTRU (e.g., a reachable WTRU) may consume a considerable amount of power. One or more implementations may attempt to balance WTRU reachability having an appropriate level of latency with WTRU power savings.

As described herein, an awake state may be or may include a state where a WTRU monitors one or more control channels (e.g., PDCCH, CORESET, and/or search space). An awake state may correspond to certain periods of time. For example, an awake period may correspond to times when one or more of the ON duration timers, inactivity timers, and/or retransmission timers are active or running. As described herein, a sleep state may be or may include time (e.g., any time) during a DRX cycle where a WTRU is not in an awake state. For example, the time when a WTRU is not expected to monitor one or more control channels may be a sleep state. In examples, a timer for a sleep state may be used to determine the duration of the sleep state in an absolute manner. In examples, a timer for a sleep state may be used to indicate the time between the starting points of two consecutive awake states.

DRX may be performed for transmission using an unlicensed spectrum. A WTRU may be configured with a DRX pattern, which may determine an activity state of the WTRU. An activity state may be characterized by one or more of a set of PDCCH monitoring occasions (e.g., and/or control resource sets (CORESETs)), a set of one or more BWPs to monitor, and/or a set of downlink control information (DCI) formats used for blind detection. For example, a WTRU may be configured with an awake state. When the WTRU is in an awake state, the WTRU may be configured with one or more (e.g., multiple) PDCCH monitoring occasions (e.g., in multiple CORESETs). The PDCCH monitoring occasion may occur within a slot, for multiple BWPs, and/or for one or more DCI formats (e.g., multiple DCI formats). The WTRU may be configured with a sleep state/lower activity state. When the WTRU is in a sleep state/lower activity state, the WTRU may be configured with fewer PDCCH monitoring occasions having a larger periodicity. For example, the WTRU may be configured with fewer PDCCH monitoring occasions than that of the awake state or no PDCCH monitoring occasions. The PDCCH monitoring occasions may occur for a BWP (e.g., a single BWP) and for fewer DCI formats. For example, the PDCCH monitoring occasions may occur fewer than that of the awake state.

A WTRU may be configured with a timer, which may be used to switch states. The timer may terminate. Upon termination of the timer, the WTRU may toggle from one state to another. Depending on the state, the WTRU may trigger (e.g., or reset) the timer based on receiving a transmission from a gNB or based on the time at which it entered the state. For example, when a WTRU is in a low activity state (e.g., or sleep state), the WTRU may reset the timer upon entering that state. Upon expiration of the timer, the WTRU may enter a higher activity state (e.g., or awake state). A WTRU may use one or more of the following to determine when to trigger/start a timer, and possibly how to determine the value of the timer (e.g., for toggling back to the sleep state). A WTRU may use reception of a DCI for the WTRU for determining a trigger/start timer and/or the value of the timer. A WTRU may use reception of a DCI in a common search space for determining a trigger/start timer and/or the value of the timer. A WTRU may use reception of a reference signal (RS) for determining a trigger/start timer and/or the value of the timer. A WTRU may use reception of a preamble for determining a trigger/start timer and/or the value of the timer. A WTRU may use reception of a go-to sleep signal for determining a trigger/start timer and/or the value of the timer. A WTRU may determine triggering/starting a timer and/or the value of the timer based on when the WTRU entered the awake time.

One or more of the following may apply when a WTRU receives DCI. For example, when a WTRU receives DCI using a WTRU-specific radio network temporary identifier (RNTI), the WTRU may reset/restart the timer to a value (e.g., a first value). A WTRU may be configured with a timer value(s). For example, a WTRU may be configured with two timer values. A first timer value may be a (relatively) long timer value and a second value may be a (relatively) short timer value. The WTRU may receive a DCI using a WTRU-specific RNTI. When the WTRU receives a DCI using a WTRU-specific RNTI, the WTRU may reset the timer to the first value (e.g., the long timer value). When the WTRU does not receive a DCI using a WTRU-specific RNTI, the WTRU may reset the timer to the second time value (e.g., short timer value).

One or more of the following may apply when a WTRU receives DCI via a common search space. For example, upon reception of the DCI in the common search space, the WTRU may reset/restart the timer to a value (e.g., a first value). The timer value used may be based on the type of indication (e.g., WTRU-specific DCI and/or common search space DCI). The timer value selection may be similar (e.g., the same) as DCI using WTRU-specific RNTI described herein. For example, the DCI may be decoded using a RNTI used to determine channel acquisition, such as a channel occupancy RNTI. The DCI may indicate that a channel has been successfully acquired. The WTRU may determine to go back to sleep (e.g., more rapidly) based on a decoded DCI transmission for channel acquisition and/or the lack of a scheduling DCI. The DCI may use a WTRU-specific RNTI and/or common RNTI to schedule uplink and/or downlink transmissions applicable to the WTRU.

One or more of the following may apply when a WTRU receives a RS. For example, upon reception of a discovery RS (DRS) or a component thereof (e.g., synchronization signal block (SSB)), a WTRU may reset/restart a timer to a value (e.g., a first value as described above).

One or more of the following may apply when a WTRU receives a preamble. For example, a WTRU may receive a preamble (e.g., a non-scheduling preamble), which may indicate that the channel was acquired. Upon reception of the preamble, the WTRU may reset/restart a timer to a value (e.g., a first value as described above).

One or more of the following may apply when a WTRU receives a go-to sleep signal. For example, upon reception of a signal indicating for the WTRU to go-to sleep, the WTRU may go to a sleep state (e.g., may immediately go to a sleep state).

One or more of the following may apply when the WTRU determines when to trigger/start a timer, and possibly how to determine the value of the timer (e.g., for toggling back to the sleep state) based on when the WTRU entered the awake time. Upon entering the awake state, the WTRU may set a timer to a timer value (e.g., a first timer value). The timer may be associated with an amount of time that the WTRU remains in an active/awake state. For example, the timer may be associated with an amount of time that the WTRU remains in an active/awake state assuming the WTRU is not later triggered to change the value, re-start the timer, etc. based on later observed events or transmissions.

A WTRU in the awake state (e.g., or the ON duration of a DRX cycle) may monitor one or more channels. The WTRU may attempt to receive one or more of the signals and/or transmissions described herein during the awake state. Upon reception of such a transmission from a serving cell, a WTRU may determine that the channel was acquired (e.g., successfully acquired) by its serving cell during its ON duration. The WTRU may assume (e.g., may then assume) that a lack of any other transmissions intended to assign DL resources for the WTRU means that the WTRU may return to sleep and/or may proceed with the DRX cycle.

One or more of the following may occur when the WTRU receives a transmission from its serving cell during its ON duration. For example, the WTRU may receive a transmission other than a scheduling assignment from the serving cell during its ON duration. The WTRU may receive a transmission, and the WTRU may be in a DRX cycle, such as a short DRX cycle or a long DRX cycle. Upon receiving a transmission and currently being in a short DRX cycle, the WTRU may continue to be in the short DRX cycle or the WTRU may switch to a long DRX cycle. For example, upon receiving a transmission and currently being in a short DRX cycle, the WTRU may continue to be in the short DRX cycle until expiration of a timer. Upon receiving a transmission and currently being in a long DRX cycle, the WTRU may continue to be in the long DRX cycle. Upon receiving a transmission and currently not being in a DRX cycle, the WTRU may continue the inactivity timer and/or trigger the inactivity timer to determine when to enter a DRX cycle.

The WTRU may not receive a transmission from a serving cell, and the WTRU may be in a DRX cycle, such as a short DRX cycle or a long DRX cycle. If the WTRU does not receive a transmission from the serving cell during its ON duration, one or more of the following may occur. If the WTRU does not receive a transmission and the WTRU is currently in a short DRX cycle, the WTRU may continue the short DRX cycle and/or may restart/pause the short DRX cycle timer. If the WTRU does not receive a transmission and the WTRU is currently in a long DRX cycle, the WTRU may return to the short DRX cycle and/or may start the short DRX cycle timer. If the WTRU does not receive a transmission, the WTRU may begin a new DRX cycle (e.g., shorter than short DRX cycle) and/or start a new DRX cycle timer (e.g., having shorter duration than short DRX cycle timer).

If the WTRU does not receive a transmission from its serving cell during its ON duration and if the WTRU is currently in a short DRX cycle, the WTRU may continue the short DRX cycle and/or may restart/pause the short DRX cycle timer. If the short DRX cycle timer is paused, the timer may be resumed upon the WTRU receiving a transmission from the serving cell during an ON duration. For example, the timer may be resumed when the WTRU receives a transmission other than a transmission with a scheduling assignment for the WTRU.

The WTRU may return to a short DRX cycle and/or may start the short DRX cycle timer. If the WTRU does not receive a transmission from its serving cell during its ON duration and if the WTRU is currently in a long DRX cycle, the WTRU may return to a short DRX cycle and/or may start the short DRX cycle timer. In examples, the WTRU may enter a short DRX cycle and/or may remain in the short DRX cycle until reception of a transmission from the serving cell (e.g., other than a transmission with a scheduling assignment for the WTRU). Upon reception of such a transmission, the WTRU may return (e.g., immediately return) to the long DRX cycle.

The WTRU may begin a new DRX cycle with a new DRX cycle timer. For example, the new DRX cycle may be shorter than a short DRX cycle, and the new DRX cycle timer may have shorter duration than a short DRX cycle timer. If the WTRU does not receive a transmission from its serving cell during its ON duration, the WTRU may begin a new DRX cycle and/or may start a new DRX cycle timer. The new DRX cycle and/or the new DRX cycle timer may be used to determine/declare radio link failure (RLF) condition. Upon reception of a transmission during an ON duration of the new DRX cycle, the WTRU may stop and/or cancel the new DRX timer and may enter a regular DRX cycle (e.g., short or long DRX cycle). For example, if the WTRU was in a short/long DRX cycle prior to entering the new DRX cycle, the WTRU may return to the short/long DRX cycle, respectively. While in the new DRX cycle, the WTRU may pause another ongoing DRX cycle, such as the short and/or the long DRX cycle timer(s) (e.g., if configured and/or active). Upon expiration of the new DRX cycle timer, the WTRU may declare RLF.

A WTRU may determine that a channel is being used or is otherwise occupied. For example, a WTRU may determine the channel is being occupied due to a transmission associated with the cell of the WTRU or by an interfering cell. Such a determination may enable the WTRU to determine whether the WTRU is reachable by the cell for transmission of signals/channels during an awake period. For example, a WTRU may determine that the channel occupancy during an awake period is above or below a certain threshold. The WTRU may determine the channel occupancy based on interference measurements on the channel. In examples, the occupancy may be determined in terms of an interference measurement being above or below a threshold. The interference measurement may be performed in one or more time instances. In examples, the channel occupancy may be determined based on the number of instances that the interference on a channel is above or below a certain threshold.

When a WTRU determines that a channel is occupied, the WTRU may determine whether to trigger or reset a timer (e.g., along with the value of the timer). For example, if a channel is determined not to be occupied during an awake state and the WTRU does not receive a signal from the network, the WTRU may assume that the network does not have a traffic to transmit to the WTRU. As such, the WTRU may trigger a first timer (e.g., which may be a short timer) based on the last received transmission and/or based on the time the WTRU entered an awake state. The WTRU may change states and/or go to sleep when the timer expires.

In examples, if a WTRU observes high channel occupancy during an awake state, the WTRU may perform one or more of the following. The WTRU may trigger a timer based on the last received transmission or based on the time the WTRU entered the awake state. If the WTRU triggers a timer, the length of the timer may be relatively long, for example to enable more occasions in which the WTRU is reachable. For example, the timer may correspond to the amount of time the WTRU remains in an active state. The WTRU may change states and/or go to sleep when the timer expires. For example, the timer may be longer than if the channel had been unoccupied in order to allow for the network to acquire the channel and/or let the WTRU know if it will be scheduled.

The WTRU may pause an ongoing timer until the WTRU determines that the channel is not occupied (e.g., occupied by an interfering node) or until the WTRU resets the timer due to one or more of the scenarios described herein. The WTRU may add time to a timer that may be already running. For example, if the WTRU enters an awake state and observes little or no channel occupancy, the WTRU may trigger a first timer, which may be shorter than a timer that would be used had the channel been determined to have high occupancy. If the WTRU senses an increase in channel interference (e.g., indicating that the channel occupancy is high), the WTRU may extend the timer such that a longer overall timer value may be used. The WTRU may reset a timer. For example, the WTRU may reset the timer based on a determination that channel occupancy is high.

A WTRU may receive an indication to toggle to a sleep state. For example, the indication may be an explicit indication or an implicit indication to toggle to a sleep state.

A WTRU may receive a transmission(s) during an awake time period. The WTRU may determine (e.g., determine to be aware) of the time remaining for channel occupancy. For example, the WTRU may determine to be aware of the time remaining for channel occupancy based on the maximum channel occupancy time (MCOT). The WTRU may receive an indication (e.g., an explicit or an implicit indication), within the COT, signaling whether or not the network intends to reacquire the channel (e.g., reacquire the channel immediately after the MCOT expires). If the WTRU receives an indication that the network will not attempt to reacquire the channel at the end of the MCOT, the WTRU may enter (e.g., may immediately enter) a sleep state upon expiration of the MCOT. For example, the timing of toggling to a sleep state may have precedence over an active and non-expired awake timer. If the WTRU receives an indication that the network will attempt to reacquire the channel at the end of the MCOT, the WTRU may trigger an awake timer. For example, a new awake timer may be a specific timer duration based on the reception of such an indication. The value of the timer may be indicated (e.g., explicitly or implicitly indicated) by the network, or the value may be configured (e.g., fixed). In examples, the timer may be infinite, and the WTRU may remain awake until the network reacquires the channel. If the timer is infinite and the WTRU remains awake until the channel is reacquired, a regular awake timer may be restarted when the WTRU receives an indication that the channel has successfully been reacquired. The WTRU may refrain from restarting the regular awake time until the channel is acquired.

A WTRU may receive an indication with one or more BWPs of a carrier where a channel may be reacquired. For example, the indication may be provided to the WTRU in an indication (e.g., the same indication) that the network intends to reacquire the channel after the current MCOT expires. If the network indicates that the channel may be acquired using a BWP from a set of BWPs, the WTRU may monitor multiple BWPs (e.g., the set of BWPs) during the awake time.

A WTRU may transmit data using an adaptive DRX cycle. For example, an adaptive DRX cycle may be or may include determining and/or varying sleep and/or awake timers based on a transmission history of a WTRU. The timers used may change and/or the values of DRX timers may change in an adaptive DRX cycle. For example, the timers may be changed and/or the length of the timers may be changed based on observed conditions, such as channel occupancy and/or channel acquisition.

A WTRU may determine the duration of a timer for a first state. For example, the WTRU may determine the duration of a timer for a first state based on an event occurring in a second state. The WTRU may monitor a channel (e.g., an unlicensed channel) for signals during an awake state or a monitoring state. The signals may be or may include a signal indicating that the channel has been acquired (e.g., via a channel acquisition indication) and/or a signal including a message about scheduling information for a transmission to or from the WTRU on the channel. In examples, the WTRU may determine a timer duration for a sleep state (e.g., the timer triggered upon entering the sleep state). The WTRU may determine a timer duration for a sleep state based on whether the WTRU received a transmission during the awake state (e.g., a monitoring state, such as a first monitoring state). For example, if the WTRU did not receive a transmission (e.g., neither the channel acquisition indication signal nor the scheduling information signal) during the awake state (e.g., the monitoring state), the WTRU may use a first timer (e.g., or timer duration) for one or more subsequent sleep states. Such a first timer duration may be a determined from a set of timer values (e.g., a configurable set of timer values) and/or may be for a short duration. The WTRU using the first timer duration with the short duration may allow the WTRU to enter the subsequent awake state/ monitoring state (e.g., the second awake state/the second monitoring state).

If the WTRU receives one or more scheduling information (e.g., such as DCIs), the WTRU may use a second timer (e.g., or timer duration). The second timer duration may be determined from the set of timer values (e.g., the configurable set of timer values) and may be for a longer duration (e.g., longer than the first timer). The WTRU may send or receive the transmission based on the one or more scheduling information and/or DCIs.

If the WTRU does not receive scheduling information (e.g., DCI), but receives an indication that the channel was acquired by a network during the awake state (e.g., as discussed herein), the WTRU may use a third timer (e.g., or timer duration). The third timer may have similar (e.g., the same) time value as the second timer. If the WTRU receives no transmission from the network during the awake period, the WTRU may determine the timer duration based on the channel occupancy techniques discussed herein.

A WTRU may receive an indication (e.g., an explicit indication) from a network (e.g., a gNB) during an awake state, indicating a timer duration to use for one or more subsequent sleep periods. The indication may be used (e.g., may also be used) to reconfigure timers and/or triggers for subsequent awake states.

A WTRU may determine a timer value as a function. For example, the WTRU may determine a timer value as a function based on receiving one or more transmissions during the awake time and a previous value of the timer. For example, when the WTRU enters an awake period, the WTRU may start a first timer. If the first timer expires before the WTRU receives a transmission, the WTRU may start a second timer and may enter and remain in a sleep state until the expiration of the second timer. The WTRU may enter (e.g., reenter) the awake period using the first timer. If the WTRU receives no transmission and the first timer expires during the subsequent awake time (e.g., the second awake time), the WTRU may start the second timer and enter/ remain in the sleep state (e.g., the second sleep state). The duration of the second timer may be determined based on the WTRU not receiving a transmission during the previous awake state and/or a timer value used for a previous sleep state. For example, if the WTRU does not receive a transmission during an awake state (e.g., subsequent awake state, such as the second awake state), the value of the second timer may decrease when compared to the value of the second timer associated with the previous sleep state (e.g., the first sleep state). For example, the value of the second timer may decrease down to a configurable minimum value when compared to the value of the second timer associated with the previous sleep state (e.g., the first sleep state). If the WTRU receives a transmission during the awake state (e.g., regardless of whether the transmission is for the WTRU specifically or just to indicate the channel has been acquired by the cell), the WTRU may use a longer timer for a subsequent sleep period than the timer used for a previous sleep period. For example, the longer timer may be limited by a maximum value, which may be configured by the network.

A value of an awake timer may be determined based on an activity that occurred during a previous awake time and/or the duration of a previous sleep timer. For example, if a WTRU does not receive a transmission in one or more previous awake periods, the WTRU may use a longer timer for a subsequent awake period. The WTRU may use a longer time for a subsequent awake period given that the channel may have high occupancy and the network may need more time to acquire the channel. The subsequent awake period may have a timer set to infinite to ensure the reception of one or more transmissions.

Figure 2:
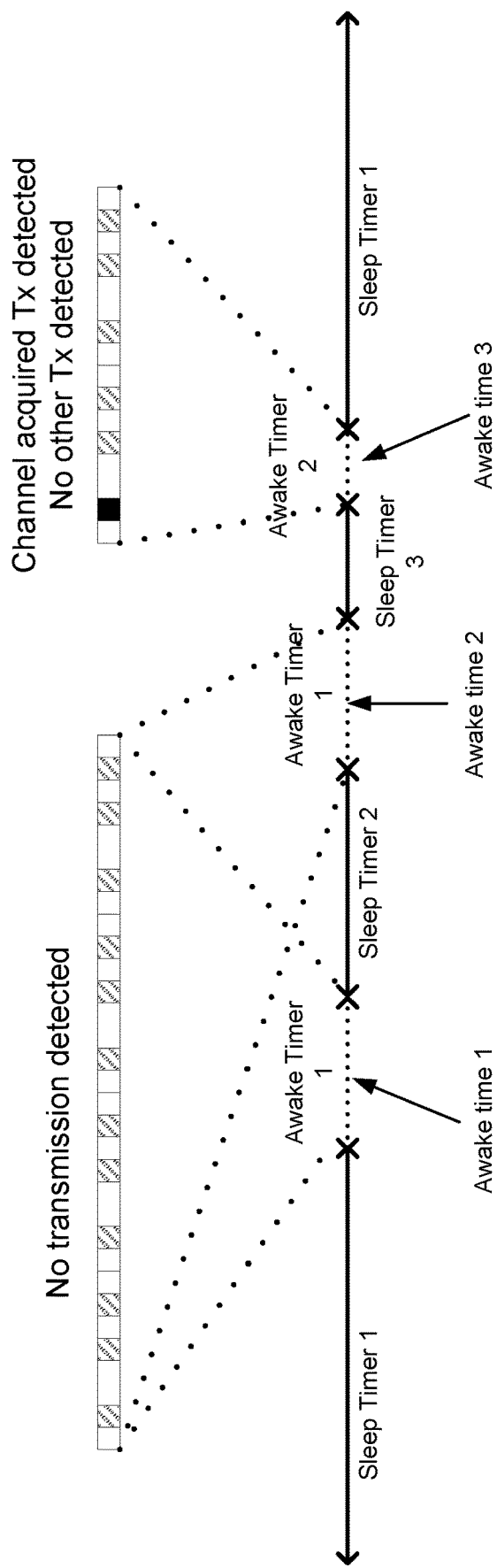
FIG. 2 is an example of an adaptive discontinuous reception (DRX) cycle.

FIG. 2 is an example of an adaptive DRX cycle. As shown in FIG. 2, adaptive DRX configuration may be used to increase the number of opportunities that a network (e.g., a gNB) may have of acquiring a channel to reach a WTRU (e.g., in times of high channel occupancy). The awake or sleep time may be based on the reception of a signal (e.g., a channel acquisition signal and/or scheduling information for a transmission to or from the WTRU on the channel) in a previous and/or concurrent awake period. For example, as shown in FIG. 2, during awake time 1 and awake time 2, a WTRU may monitor a channel and may receive no transmission from a network (e.g., a gNB). The subsequent sleep timers (e.g., sleep timer 2 and sleep timer 3) may be shortened (e.g., shorten compare to sleep timer 1) to provide more opportunities to the gNB to acquire the channel to reach the WTRU. During an awake time 3, the WTRU may detect a transmission. The transmission may not have assignment. For example, the WTRU may receive a signal for channel acquisition, but may not receive scheduling information for the transmission. The WTRU may use shorter awake time (e.g., awake timer 2) and longer subsequent sleep time (e.g., using adaptive DRX configuration, such as sleep timer 1), for example based on receiving the signal during awake time 3.

As shown in FIG. 2, the timers used for awake states and/or the timers used for subsequent sleep states may be adapted based on a reception of a transmission by a WTRU during the awake time. A WTRU may determine to use (e.g., may be configured to use) a first sleep timer. After the first sleep timer expires, the WTRU may enter an awake state and monitor the PDCCH for transmissions. Upon entering the first awake state, the WTRU may trigger a first timer (e.g., long timer). Upon expiration of the first timer, the WTRU may return to a sleep state and/or may reduce the sleep state timer duration. When the WTRU receives a transmission from the network, the first timer may be stopped, and a second timer (e.g., short timer) may be triggered. The value of the short timer may be determined. For example, the value of the short timer may be determined as a function of a fixed or configurable value and the time elapsed since the beginning of the awake time. Upon expiration of the second timer, the WTRU may enter a sleep state having a longer sleep state timer duration.

In examples, upon reception of a transmission from the network, a WTRU may shorten the first timer (e.g., shorten by a configurable amount of time). Upon expiration of the shortened timer, the WTRU may enter a sleep state having a longer sleep state timer duration. As illustrated in FIG. 2, during the first and second awake times (e.g., awake time 1 and awake time 2), the WTRU may not receive a transmission. As seen in FIG. 2, if the WTRU does not receive a transmission within the first or the second awake time, the WTRU may stay awake for the duration of the first awake timer and subsequent sleep timers may be reduced. For example, as shown in FIG. 2, sleep timer 2 may be shorter than sleep timer 1, and sleep timer 3 may be shorter than sleep timer 2 and sleep timer 1. As seen in FIG. 2, the WTRU may receive a DL transmission (as shown in FIG. 2, black square during Awake Timer 2) during a third awake time (e.g., awake time 3). The transmission may be a DRS transmission or an indication that the channel was acquired (e.g., a channel acquisition indication). If the WTRU receives a transmission, validity criterion of the second awake timer (e.g., that the WTRU receives a transmission from the network) has been achieved. The first timer may be stopped and the second timer may be reset when the WTRU receives a PDCCH for a transmission other than channel acquisition. If the WTRU receives a DL transmission during an awake state, a subsequent sleep timer duration may be increased. For example, the subsequent sleep timer duration may be increased from a previous sleep timer duration up to a maximum value. Table 1 illustrates an example MAC specification that may be used to implement an example of adjustable timers (e.g., for the awake state and/or the sleep state).

TABLE 1

1>If the MAC entity is in Active Time:
   2>monitor the PDCCH
   2>Start a first timer (e.g., drx-channel-occupation-unknown-timer)
   2>If the PDCCH indicates a channel occupied
      3>Start a second timer (e.g., drx-channel-occupied-timer)
      3>Stop the drx-channel-occupation-unknown-timer if it is running
   2>If the PDCCH indicates a DL transmission or UL grant
      3>Start or restart a timer (e.g., drx-HARQ-RTT-TimerDL or drx-HARQ-RTT-TimerUL or drx-InactivityTimer)
      3>Stop the drx-channel-occupied-timer if it is running.
      3>Stop the drx-channel-occupation-unknown-timer if it is running
1>If the drx-channel-occupation-unknown-timer expires
   2>Enter sleep time
   2>set drx-sleep-timer to a value smaller than the previous drx-sleep-timer value to a minimum value)
   2>start drx-sleep-timer
   2>set drx-channel-occupation-unknown-timer to a value larger than a previous drx-channel-occupation-unknown-timer (up to a maximum value).

An awake timer may be started at the beginning of an awake period (e.g., at the beginning of an ON duration) or at the end of a last scheduled DL transmission within the awake period. Upon elapsing the awake timer, the WTRU may go to sleep state. The timer (e.g., awake timer) may be considered elapsed if the full timer has elapsed or if a WTRU has received a transmission (e.g., a transmission indicating the WTRU go to sleep). An awake timer may be cancelled based on one or more of the following. An awake timer may be cancelled based on reception of a channel scheduling another transmission. An awake timer may be cancelled based on reception of a channel and/or a signal indicating a network (e.g., a gNB and/or the like) has acquired the channel during the ON duration. An awake timer may be cancelled based on reception of a signal indicating the WTRU to monitor the PDCCH (e.g., wake-up signal).

Upon cancelling a first awake timer, the WTRU may start a second awake timer. The second awake timer may be cancelled upon reception of a DCI for that WTRU (e.g., WTRU with the second awake timer). The WTRU may be configured to continue to use the second awake timer until the DCI is received.

For example, a WTRU may be scheduled with a first awake timer of duration n symbols and a second awake timer of duration m symbols. Upon starting the ON duration, the WTRU may start the first timer. In examples, if the WTRU receives no transmission (e.g., from its serving cell) during the n symbols, the WTRU may go back to sleep state. In examples, if the WTRU receives a signal indicating that the channel has been acquired by a network (e.g., a gNB and/or the like), the WTRU may cancel the first awake timer and may start a second awake timer. If the WTRU receives no DCI during the subsequent m symbols, the WTRU may return to sleep state. The value of m for the second awake timer may depend on how much time has elapsed since the first awake timer was started. For example, the value of m may be defined as $m=k-j$, where k may be fixed, and j may be the time between the start of the awake period (e.g., or ON duration) and the time that the second timer was started.

A WTRU may monitor a channel for the presence of a wake-up signal (WUS). The signal (e.g., WUS) may include, but not limited to a reference or synchronization signal scrambled with a specific sequence, a PDCCH transmission with cyclic redundancy check (CRC) scrambled with a specific RNTI, and/or the like.

In examples, upon reception of a WUS, a WTRU may update an ongoing awake timer. For example, the WTRU may cancel a first awake timer and may trigger a second awake timer.

In examples, a WTRU may monitor for a WUS during a sleep state. Reception, or lack thereof, of an awake signal during a sleep state may be used to determine the awake timer (e.g., or duration thereof) of a subsequent awake state. For example, if a WTRU receives a WUS during a sleep state, the WTRU may use a first awake timer in a subsequent awake state. If the WTRU does not receive a WUS signal during a sleep state, the WTRU may use a second awake timer in a subsequent awake state. For example, the second awake timer may have a timer of duration 0, such that the WTRU restarts (e.g., immediately restarts) a DRX cycle.

A network may attempt to transmit the WUS multiple times or in multiple time/frequency resources for a WTRU (e.g., for robustness). The WTRU may monitor the multiple resources, at least until successful reception of a WUS in a period (e.g., in a sleep state or in an ON duration).

A WTRU may receive and/or detect a WUS from a network. If a WTRU receives or detects a WUS from a network, the WTRU may expect a transmission (e.g., another transmission) during an ongoing or subsequent ON duration. For example, the WTRU may detect a WUS in a sleep state and may expect to receive a scheduling DCI in subsequent ON duration (e.g., from a network). The WTRU may fail to receive or detect a WUS in a sleep state, and the network may indicate to the WTRU that the WTRU should not expect a transmission (e.g., another transmission) in an ongoing or subsequent ON duration. The information about whether or not to expect a transmission may be used by the WTRU to determine the timer value of a future sleep state (e.g., subsequent sleep state).

For example, during a first sleep period using a first sleep timer, the WTRU may not detect one or more WUSs in a set of resources. The set of resources may be used to provide the cell multiple chances to transmit the WUS. Upon entering an awake state, the WTRU may use a first awake timer. Upon re-entering the sleep state (e.g., entering a second sleep state) at the end of the awake period (e.g., if the WTRU has not been scheduled), the WTRU may reuse the first sleep timer.

A WTRU may detect a WUS in one or more the configured WUS resources. For example, a WTRU may detect a WUS in one or more the configured WUS resources during the first sleep period. If the WTRU detects a WUS in one or more the configured WUS resources during the first sleep period, the WTRU may use a second awake timer upon entering the awake state. If the WTRU receives a transmission during the awake period, upon returning to the sleep state, the WTRU may reuse the first sleep timer. The transmission that the WTRU receives during the awake period may include one or more of a scheduling DCI, a data transmission, a signal indicating the channel has been acquired by a cell, and/or the like. If the WTRU does not receive a transmission during the awake period following the sleep period where the WTRU detected a WUS, the WTRU may use a second sleep timer (e.g., shorter than the first sleep timer) upon returning to the sleep state.

Figure 3:
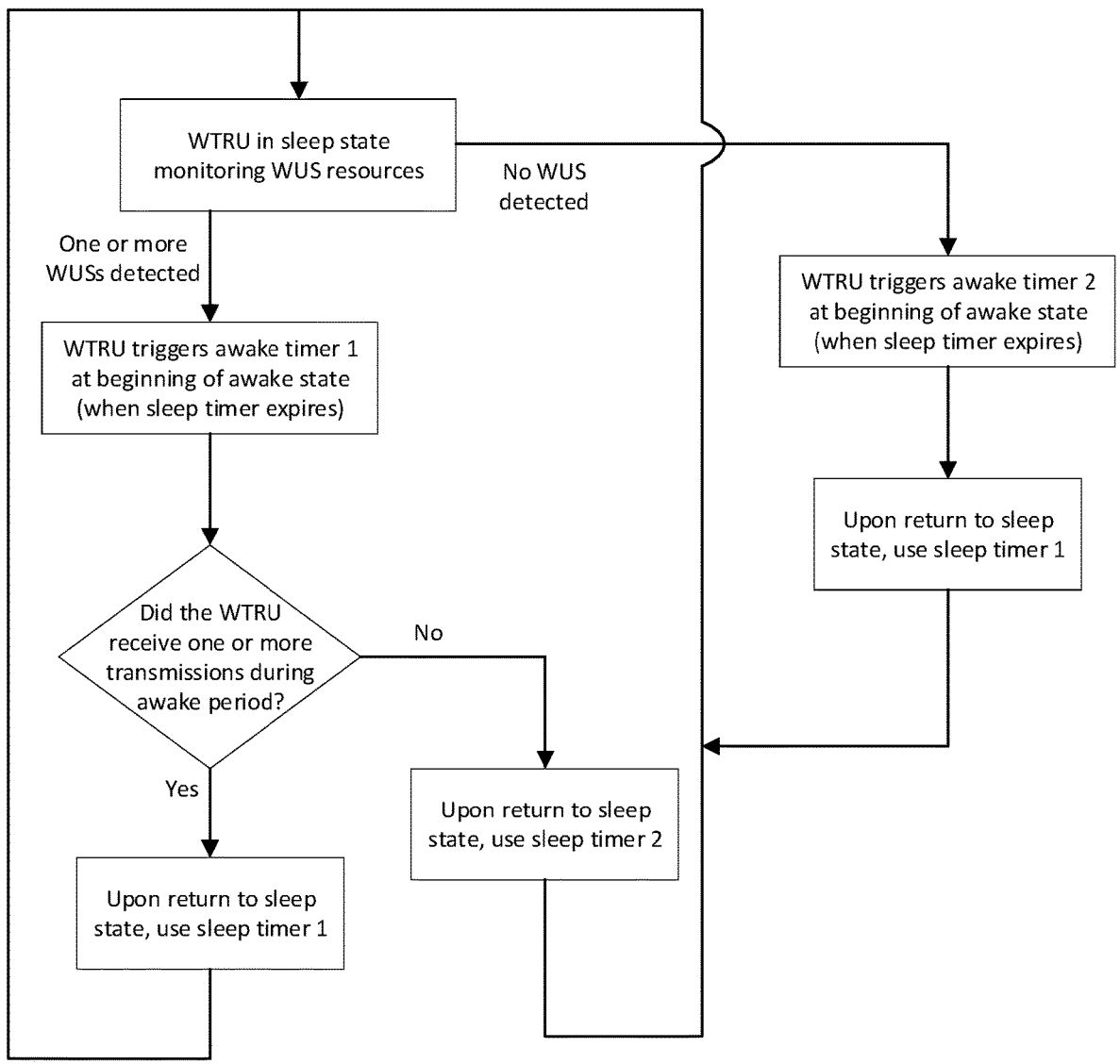
FIG. 3 illustrates an example flowchart for DRX timer determination based on wakeup signal detection.

FIG. 3 illustrates an example for DRX timer determination based on wake-up signal detection. For example, FIG. 3 may use WUS detection during a sleep state. In examples, if the WTRU detects one or more WUSs during a sleep state, WTRU may use a first timer (e.g., awake timer 1) in a subsequent awake state (e.g., ON duration). If the WTRU receives one or more transmissions during the ON duration (e.g., subsequent ON duration/subsequent awake state), the WTRU may return to the sleep state and may use a sleep timer 1 (e.g., upon expiration of the awake timer 1). If the WTRU receives no transmission during the ON duration, the WTRU may return to the sleep state and may use a sleep timer 2 (e.g., upon expiration of the awake timer 1). The sleep timer 2 may have less duration than the duration of the sleep timer 1. The transmission expected during an awake period following a sleep period, where a WUS was received, may include one or more of a scheduling DCI, a signal indicating the channel is acquired by a cell, a data transmission, an RS transmission, and/or the like. If during the sleep state, the WTRU did not detect a WUS, the WTRU may enter the awake state and may use an awake timer 2 (e.g., upon expiration of the sleep timer). The awake timer 2 may have less duration than the duration of the awake timer 1. The WTRU may not expect a transmission during the awake state. The WTRU may not expect a transmission during the awake state. For example, the WTRU may not expect a transmission during the awake state due to a lack of a preceding WUS. If the WTRU does not expect a transmission during the awake state, the WTRU may use a sleep timer (e.g., a fixed sleep timer) for a subsequent sleep state (e.g., regardless of whether the WTRU receives a transmission during the awake period).

In examples, a WTRU may be configured with two or more DRX configurations and may apply the appropriate configuration based on a set of conditions. In examples, the WTRU may use a DRX cycle (e.g., a short DRX cycle or a long DRX cycle) based on such conditions. The set of conditions may provide a DRX configuration allowing for more scheduling opportunities (e.g., shorter DRX cycle) is applied when the WTRU determines that the network may not have successfully acquired the channel.

For example, two or more (e.g., two) DRX configurations may be configured. The WTRU may apply a first DRX configuration (e.g., or a short DRX cycle) under one of more of the following conditions. The WTRU may apply a first DRX configuration (e.g., or a short DRX cycle) if a drx-onDuration timer has expired. The WTRU may apply a first DRX configuration (e.g., or a short DRX cycle) if PDCCH was not received while the drx-onDuration timer was running (e.g., on or more of an inactivity timer, DL or UL retransmission timer, and/or DL or UL HARQ RTT timer is not running). The WTRU may apply a first DRX configuration (e.g., or a short DRX cycle) if a wake-up signal was received before a drx-onDuration was last started. The WTRU may apply a first DRX configuration (e.g., or a short DRX cycle) if a wake-up timer is running, where a wake-up timer may be started upon reception of a wake-up signal and may be stopped upon reception of a PDCCH.

In examples, a wake-up timer may be restarted upon reception of another wake-up signal. For example, a wake-up timer may be restarted upon reception of another wake-up signal prior to the wake-up timer being stopped or expiring.

The WTRU may apply a second DRX configuration (e.g., or a long DRX cycle) under one or more of the following conditions. The WTRU may apply a second DRX configuration (e.g., or a long DRX cycle) if a PDCCH was received. The WTRU may apply a second DRX configuration (e.g., or a long DRX cycle) if a wake-up timer expires.

A WTRU may enter an IDLE mode when operating in an adaptive DRX cycle. In IDLE mode, awake states or periods of a WTRU may be configured such that they match paging occasions and/or system information (SI) transmission occasions. The timing of a toggle (e.g., from a low activity or sleep state to a higher activity or awake state) may be fixed (e.g., fixed independently) of the time when the WTRU enters a sleep state.

When a WTRU is in an IDLE mode awake state, one or more of the following may occur. For example, when a WTRU is in an IDLE mode awake state, the WTRU may receive DCI indicating paging information for the WTRU. When a WTRU is in an IDLE mode awake state, the WTRU may receive DCI scheduling SI. When a WTRU is in an IDLE mode awake state, the WTRU may receive a signal indicating a channel has been acquired (e.g., by the network). If the WTRU receives a signal indicating that a channel has been acquired, the WTRU may assume that the WTRU not receiving DCI for paging or SI transmission is not caused by the network being unable to acquire the channel.

When a WTRU receives DCI indicating paging or SI transmission, the WTRU may proceed with the appropriate processes to receive such transmissions. When a WTRU receives a signal indicating that a channel has been acquired (e.g., and no other DCI), the WTRU may return to a sleep state (e.g., until a later planned paging or SI occasions).

If a WTRU does not receive a transmission during IDLE mode active period (e.g., paging occasion (PO) or paging frame (PF)) or does not receive a signal indicating channel acquisition during an awake state, the WTRU may be unsure of whether the network acquired the channel during the awake period. The WTRU may remain in the awake state longer based on not receiving a signal (e.g., any signals) from the network. For example, the WTRU may trigger a timer at the beginning of an awake state. The timer may be cancelled upon reception of one of the above signals or may expire naturally. Upon expiration of the timer, the WTRU may return to sleep state.

A WTRU may determine a timer value for a subsequent awake period.

The timing of a subsequent paging or SI transmission occasion may be determined based on the reasoning or cause for entering sleep state. For example, if during an awake time (e.g., or PO and/or PF) and if the WTRU receives a DCI for paging or for SI transmission, the WTRU may determine a future paging or SI transmission occasion based on a first function (e.g., or a function using a first set of inputs, such as type of received transmission or DRX cycle duration). If during an awake time, the WTRU receives a signal indicating that a channel has been acquired (e.g., and does not receive anything else from the network), the WTRU may determine a future paging or SI transmission occasion based on a second function (e.g., or a function using a second set of inputs, such as DRX cycle duration). If during an awake time, the WTRU does not receive a transmission, the WTRU may determine a future paging or SI transmission occasion from a third function (e.g., or a function using a third set of inputs, such as number of consecutive POs and/or PFs without receiving a transmission, or DRX cycle duration).

For example, the system frame number (SFN) of a PF for a WTRU may be determined based on by the following equation (1):

$$(SFN+PF\_offset-LBT\_offset) \bmod T = (T \operatorname{div} N)^* (WTRU\_ID \bmod N),$$
$$LBT\_offset = LBT\_Counter * LBT\_SFN\_Delta \quad (1)$$

Parameter T may be a DRX cycle. Parameter N may be N=min(T,nB). Parameter nB may be the number of total paging occasions in T. Parameter PF_offset may be an offset used for PF determination. Parameter WTRU_ID may be WTRU_ID=IMSI mod 1024. Parameter LBT_SFN_Delta may be an offset used if the WTRU does not determine the presence of any transmission from the gNB during a given PF. Parameter LBT_Counter may count the number of consecutive PFs where the WTRU does not receive any transmission from the gNB. LBT_Counter may reset to zero when a WTRU receives a transmission from the gNB in a PF.

In examples, a signal transmitted during an awake state may indicate (e.g., explicitly indicate) the timing (e.g., or the inputs to a function to determine the timing) of a future paging or SI transmission occasions to the WTRU. If the WTRU receives a transmission during an awake state, the WTRU may enter a sleep state for a longer duration. If the WTRU does not receive a transmission during an awake state, the WTRU may enter the sleep state for a shorter duration.

In examples, a WTRU may receive an indication of the timing for one or more subsequent paging or SI transmission occasions during a transmission in an awake state. For example, the network may acquire the channel during an awake state of a WTRU but may not be able to schedule that WTRU during an ongoing channel occupancy time. For example, this may be due to possibly higher priority traffic for other WTRUs. In such a case, the WTRU may receive an indication to defer its awake period and/or to wake up in an aperiodic manner at an indicated or configurable future time. At the future wake up time, the WTRU may expect the transmission of one or more signals intended for the WTRU. The awake time may be exited after the WTRU receives one or more signals (e.g., and possibly another deferral to another wake up time). The WTRU may be configured to remain in the awake time until the WTRU receives the expected signals.

For example, a WTRU may receive a transmission during an awake state (e.g., during a PF) indicating that the WTRU may behave as though the WTRU did not receive any transmission during the PF. For example, in a high paging load scenario, the network may not have the resources to page the WTRU at that present time and/or may wish to indicate to the WTRU to use a modified PF function to reduce the paging latency. As such, the WTRU may use the modified PF function described herein to determine a future PF as if the WTRU had not received any transmissions during the PF. One or more different WTRUs may have different LBT_SFN_Delta, and the load of WTRUs that may need to be paged but could not be paged during a channel occupancy time, may be spread. For example, LBT_SFN_Delta may be determined as a function of WTRU ID.

Upon reception of a paging message, a WTRU may be indicated and/or configured to use a backoff value before beginning random access. The backoff value may be random. If a backoff time is not used, a gNB may end up having clusters of paging message transmissions (e.g., due to high channel load). If a gNB ends up having clusters of paging message transmission due to high channel load, one or more (e.g., multiple) WTRUs may respond (e.g., respond simultaneously) to pages and may reduce the random access (RA) capacity, or may prohibitively increase the channel load. A WTRU may use a backoff value (e.g., random backoff value) to determine a random time offset between reception of a paging message and the beginning of a RA procedure.

In examples, a WTRU may receive an indication during a PF that WTRU may reselect to a different cell (e.g., and/or sub-band and/or beam). Upon reselecting to the different cell/sub-band/beam, the WTRU may begin (e.g., immediately begin) monitoring for the reception of a paging message.

Paging occasion(s) and/or paging frame(s) (e.g., conditional paging occasion(s) and/or paging frame(s)) may be triggered. For example, a WTRU may activate, deactivate, etc., paging occasion(s) and/or paging frame(s) based on one or more conditions.

A WTRU may be configured with one or more of the following. The WTRU may be configured with one or more (e.g., multiple) paging occasions in a paging frame. The WTRU may be configured with one or more (e.g., multiple) paging occasions (POs) outside a paging frame. The WTRU may be configured with one or more (e.g., multiple) paging frames per DRX cycle. For paging occasion(s) outside a paging frame, such POs may occur outside of a PF and may be associated to that PF. For example, the WTRU may determine the timing of the POs based on the timing of an associated PF. For paging frame(s) per DRX cycle, a WTRU may be configured with one or more (e.g., multiple) PFs per DRX cycle. For example, a (e.g., each) PF may have its own set of POs.

When configured with one or more (e.g., multiple) POs and/or PFs (e.g., per DRX cycle), a WTRU may be configured with a PO type(s) and/or PF type(s) for a (e.g., each) PO and/or PF. In examples, a PO and/or a PF (e.g., a first type of PO and/or a first type of PF) may be considered active (e.g., always active). A WTRU may monitor the appropriate PDCCH in active POs and/or PFs. A PO and/or PF (e.g., a second type of PO and/or a second type of PF) may be considered conditional. A conditional PO and/or a conditional PF may be activated or deactivated. For example, a conditional PO and/or PF may be activated based on a pre-determined or a configurable rule. For example, a conditional PO and/or a conditional PF may be activated and may be used by a WTRU to monitor for a transmission, such as a paging message, SI, and/or the like. For example, a conditional PO and/or a conditional PF may be deactivated and may not be used by a WTRU to monitor for a transmission.

The activation or deactivation of a conditional PO and/or a conditional PF may be based on one or more of the following. The activation or deactivation of a conditional PO and/or a conditional PF may be based on reception of a signal or lack of reception a signal in a PO and/or PF (e.g., previous and/or associated PO and/or PF). The activation or deactivation of a conditional PO and/or a conditional PF may be based on reception of a signal prior to the conditional PO and/or PF. The activation or deactivation of a conditional PO and/or a conditional PF may be based on one or more measurements. The activation or deactivation of a conditional PO and/or a conditional PF may be based on one or more network indications. The activation or deactivation of a conditional PO and/or a conditional PF may be based on a time. The activation or deactivation of a conditional PO and/or a conditional PF may be based on a WTRU state.

The activation or deactivation of a conditional PO and/or PF may be based on reception of a signal or lack of reception of a signal in a PO and/or PF (e.g., previous and/or associated PO and/or PF). In examples, if a WTRU does not receive a transmission in a PO (e.g., a first PO), the WTRU may activate one or more conditional POs. The WTRU may be configured with a set of associated POs, for example where one or more members of the set may be active (e.g., always active), and the rest may be conditional. The activation of PO may be based on the presence or lack of a signal, for example the presence or lack of a signal in a set of dependent POs. For example, a first conditional PO may be based on signals present or not in the always active PO. A second conditional PO may be based on signals present in either the always active PO or the first conditional PO, and so on. In examples, a conditional PO may be assumed activated and may be deactivated upon reception of a transmission in a previous PO.

The activation or deactivation of a conditional PO and/or PF may be based on reception of a signal prior to the conditional PO and/or PF. For example, a WTRU may expect an energy signal (e.g., a low energy signal such as a wake-up signal) prior to a PO and/or a PF and prior to activating the PO and/or PF.

The activation or deactivation of a conditional PO and/or PF may be based on one or more measurements. For example, a WTRU may perform a measurement prior to a PO and/or PF possibly in a previous and/or associated PO and/or PF. Such a measurement may determine whether the channel was acquired by a serving cell. For example, the measurement may indicate whether the channel was acquired during the previous PO and/or PF. Upon determination that the serving cell was not able to transmit during the previous PO and/or PF, the WTRU may activate a conditional PO and/or PF.

The activation or deactivation of a conditional PO and/or PF may be based one or more of network indications (e.g., gNB indications). The network indication(s) (e.g., gNB indication(s)) may be or may include an information element in a DCI (e.g., a bit toggled on). A WTRU may be triggered by a network transmission (e.g., gNB transmission) to activate or deactivate a conditional PO and/or PF. The network transmission (e.g., gNB transmission) may be an implicit indication. For example, the presence of a signal (e.g., an RS) may activate or deactivate a PO and/or PF.

The activation or deactivation of a conditional PO and/or PF may be based on time (e.g., time since last activated PO and/or PF). For example, a WTRU may activate a PO and/or PF if a time (e.g., certain amount of time) has elapsed since the last time that (e.g., or another) PO and/or PF was deemed activated.

The activation or deactivation of a conditional PO and/or PF may be based on a WTRU state. A WTRU may be configured with a PO and/or a PF monitoring state. Depending on the state, the WTRU may monitor one or more different sets of POs and/or PFs. For example, in a first state, the WTRU may activate one or more (e.g., all) POs in one or more (e.g., all) PFs. In a second state, a WTRU may activate a (e.g., single) PO in one or more (e.g., all) PFs. In a third state, the WTRU may activate a PO (e.g., single PO) in a subset of states. Such states may be semi-statically configured. The configuration (e.g., semi-static configuration) may include the set of POs and/or PFs to monitor for a (e.g., each) state. A dynamic activation of conditional POs and/or PFs may be occur and the set of conditional POs and/or PFs may be based on the state of a WTRU as described herein.

Upon activating a PF, a WTRU may activate one or more (e.g., all) associated POs.

A WTRU may have a PF (e.g., a single PF) per DRX cycle. The WTRU may be configured with a PO (e.g., a first PO). The first PO may be associated with the PF that is considered active (e.g., always active). The WTRU may be configured with N other POs that may be considered conditional. If the WTRU does not receive a transmission within a first PO, the WTRU may activate one or more conditional POs in the PF and may monitor PDCCH in the conditional PO(s).

A WTRU may have one or more POs tied to a PF. The PF (e.g., and one or more associated POs) may be conditional. Upon reception of a trigger signal (e.g., a wake-up signal prior to the PF), the WTRU may activate one or more of the POs associated to the PF.

When a conditional PO and/or PF is activated, a WTRU may remain active for a set period of time (e.g., or instances) or until being deactivated. For example, if a WTRU is configured to remain active for a set period of time (e.g., or instances), an activated PO and/or PF may be activated for an instance and the WTRU may need activation or triggering for a (e.g., each) possible instance (e.g., subsequent instance(s)).

An awake period may terminate upon reception of a transmission by the WTRU.

In examples, a WTRU may enter and remain in an awake state until the WTRU receives one or more channels or signals intended for the WTRU. For example, the WTRU may remain in the awake state until the WTRU receives one or more DCIs for paging or SI, and/or until the WTRU receives an indication of a channel being successfully acquired. The WTRU may determine a future paging or SI transmission occasion based on the timing of a successful reception. In examples, the WTRU may determine a future paging or SI transmission occasion based on the timing of a last reception during an awake period.

A WTRU may perform a resynchronization of an awake period.

A WTRU may miss the transmission of a signal and/or a channel during its awake time. For example, a lack of synchronization between the WTRU and the gNB about the timing of a future paging or SI transmission occasion may cause the WTRU to miss the transmission. A WTRU may have a set of fixed occasions when the WTRU must wake up, regardless of the activity of the WTRU during a previous awake state which may dynamically adjust timer values as described herein. The mandatory wake up occasions may be configurable and/or may be determined by a function using parameters obtained in a master information block (MIB) or system information block (SIB).

In examples, the WTRU may determine the timing of a future paging or SI transmission occasion based on the beginning of a previous awake state. The determined timing may be variable and/or may be based on activity during an awake state. The configuration of possible sleep durations may overlap (e.g., may be made to ensure to overlap) with one another. The longer duration may be an integer multiple of a shorter duration.

In examples, upon an unsuccessful reception of a transmission during one or more awake periods, a WTRU may expect a modification of its paging or SI transmission occasion periodicity. After a set of awake periods (e.g., possibly consecutive awake periods) where a WTRU does not receive a transmission, the WTRU may remain awake (e.g., in a next awake period) until the WTRU receives one or more transmissions. For example, the WTRU may remain awake until the WTRU receives an SI transmission to ensure the paging occasions are synchronized.

A WTRU may monitor one or more paging messages on one or more (e.g., multiple) unlicensed channels.

A WTRU may be configured to monitor one or more (e.g., multiple) unlicensed channels for paging messages. For example, an unlicensed channel may refer to a combination of a cell, a sub-band, and/or a beam. In examples, a WTRU may be configured with different PF for each unlicensed channel. In examples, the WTRU may have a PF (e.g., a single PF) that the WTRU may monitor one or more (e.g., all) configured unlicensed channels.

In examples, a WTRU may have an unlicensed channel (e.g., a primary unlicensed channel) that the WTRU may monitor for paging messages in a PF. If the WTRU does not receive a transmission from a serving cell during a PF, the WTRU may begin monitoring one or more secondary unlicensed channels. For example, if the WTRU does not receive a transmission from a serving cell during a PF, the WTRU may begin monitoring one or more secondary unlicensed channels a new set of PFs. The WTRU may cycle through one or more different unlicensed channels. For example, the WTRU may cycle through one or more different unlicensed channels until reception of one or more transmissions from a serving cell (e.g., cycling within a PF or cycling among PFs). Upon reception of a transmission on an unlicensed channel, the WTRU may return to monitoring for paging messages in PFs on the primary channel, or the WTRU may make the unlicensed channel that received the transmission the new primary unlicensed channel (e.g., and/or may continue monitoring that channel in configured PFs).

A WTRU may monitor paging messages in PFs from a set of cells. The set may include the currently selected cell along with up to n previously selected cells. In examples, the set of cells may include one or more (e.g., all) cells with reference signal receive power (RSRP) (e.g., or reference signal receive quality (RSRQ)) above a threshold, or within an RSRP threshold of the selected cell. In examples, the set of cells may include one or more (e.g., all) cells with channel occupancy below a threshold value.

A WTRU may monitor a channel (e.g., an unlicensed channel) for a signal(s) associated with a transmission during a monitoring period (e.g., a first monitoring period). Based on the signal(s) received during the monitoring period (e.g., the first monitoring period), the WTRU may determine a time (e.g., a start time) of a subsequent monitoring period (e.g., a second monitoring period). For example, the WTRU may monitor for a signal(s) during the monitoring period for a signal for an indication that the channel has been acquired (e.g., channel acquisition) and/or a signal for a message that includes scheduling information for a transmission to and/or from the WTRU on the channel. A RS may be an example signal for the indication that the channel has been acquired. Downlink control information may be an example signal for the indication that the channel has been acquired.

The WTRU may determine a subsequent monitoring period (e.g., a second monitoring period) based on the signals received during the previous monitoring period (e.g., the first monitoring period). The WTRU may determine that the subsequent monitoring period (e.g., the second monitoring period) may occur at a first time based on receiving the signal that indicates the channel has been acquired during the first monitoring period. The WTRU may determine that the subsequent monitoring period (e.g., the second monitoring period) may occur at a second time based on not receiving the signal that indicates the channel acquisition during the first monitoring period. The WTRU may send or receive a transmission on the channel based on receiving the signal for the channel acquisition and the message that includes scheduling information.

The WTRU may determine a subsequent monitoring period (e.g., a second monitoring period) based on the signals received during the previous monitoring period (e.g., the first monitoring period). For example, the WTRU determine that the subsequent monitoring period (e.g., the second monitoring period) may occur at a first time based on receiving the signal that indicates the channel has been acquired, but not the signal associated with the scheduling information for the transmission during the first monitoring period. The WTRU may determine that the subsequent monitoring period (e.g., the second monitoring period) may occur at a second time based on not receiving neither the signal that indicates the channel acquisition nor the signal associated with the scheduling information for the transmission during the first monitoring period.

The WTRU may determine a duration (e.g., a minimum duration) of the second monitoring period to a first duration based on receiving the signal for channel acquisition but not receiving the signal for the message including scheduling information for the transmission to and/or from the WTRU on the channel during the first monitoring period. The WTRU may determine the duration (e.g., the minimum duration) of the second monitoring period to the second duration based on not receiving the signal for channel acquisition and not receiving the signal for the message including scheduling information for the transmission to and/or from the WTRU on the channel during the first monitoring period. The first duration may be longer than the second duration.

In examples, the first and the second monitoring periods described herein may correspond to active periods of DRX cycles. For example, the first and the second monitoring periods described herein may correspond to on durations of a DRX cycle. A time between an end of the first monitoring period and a start of the second monitoring period may correspond to a sleep period of the DRX cycles. The WTRU may determine the first time (e.g., the WTRU receiving the channel acquisition signal during the first monitoring period) based on a long DRX cycle configuration. The WTRU may determine the second time (e.g., the WTRU not receiving the channel acquisition signal during the first monitoring period) based on a short DRX cycle configuration.

In examples, the first and the second monitoring periods described herein may correspond to a first paging occasion and/or paging frame and a second paging occasion and/or paging frame, respectively.

The WTRU may consider an indication (e.g., in the channel acquisition signal) that the WTRU may go to sleep until a start of the second monitoring period based on the WTRU receiving the channel acquisition signal (e.g., but not receiving the signal for the message for scheduling information for the transmission) during the first monitoring period.

A WTRU may determine one or more parameters of a current and/or upcoming DRX cycle based on the presence and/or absence of a signal during a current awake period. Based on the determination, the WTRU may provide more opportunities to a network to acquire a channel to reach the WTRU.

For example, one or more of the following may be performed. The WTRU may be configured with multiple DRX durations. The WTRU may wake up from a DRX cycle at expiration of a first timer. The WTRU may monitor a presence of a signal. For example, the WTRU may monitor whether scheduling information (e.g., a PDCCH) for a transmission to assign resources or page a WTRU and/or a transmission indicating a cell acquired the channel (e.g., unlicensed channel). If the WTRU receives a signal indicating that a channel has been acquired and no other transmission, the WTRU may return to DRX using a first DRX duration. If the WTRU does not receive a (e.g., any) transmission from the cell (e.g., neither the channel acquisition signal nor the scheduling information signal), the WTRU may return to DRX using a second DRX duration. The second DRX duration may have short duration (e.g., shorter duration than the first DRX duration).

A WTRU may determine one or more parameters of a current and/or upcoming DRX cycle based on the reception, or lack thereof, of a signal in a previous or current awake period.

A WTRU may receive an indication to enter (e.g., immediately enter) DRX state (e.g., at conclusion of COT).

A WTRU may determine the timing of an aperiodic PO and/or PF based on the reception, or lack thereof, of a signal during a previous PO and/or PF.

A WTRU may receive an indication in a PO and/or PF of the timing of an upcoming aperiodic PO and/or PF.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor configured to:
monitor a channel for a plurality of types of signals during a first monitoring period, wherein the plurality of types of signals comprises a first type of signal and a second type of signal, and wherein the first type of signal is associated with an indication that indicates the channel has been acquired, and wherein the second type of signal is associated with scheduling information for a transmission to or from the WTRU on the channel;
determine a time associated with a start of a second monitoring period, wherein, the determination of the time associated with the start of the second monitoring period is based on whether the first type of signal is received during the first monitoring period, and wherein the determined time is a first time or a second time; and
determine a minimum duration associated with the second monitoring period, wherein:
if the first type of signal is received and the second type of signal is not received during the first monitoring period, a first duration is determined for the minimum duration; and if neither the first type of signal nor the second type of signal is received during the first monitoring period, a second duration is determined for the minimum duration, wherein the first duration is longer than the second duration.

2. The WTRU of claim 1, wherein if the first type of signal is received during the first monitoring period, the first time is determined for the start of the second monitoring period.

3. The WTRU of claim 1, wherein if the first type of signal is not received during the first monitoring period, the second time is determined for the start of the second monitoring period, wherein the second time is earlier than the first time.

4. The WTRU of claim 1, wherein the processor is configured to:
if the second type of signal is received during the first monitoring period, send or receive the transmission based on the scheduling information.

5. The WTRU of claim 1, wherein the channel is comprised in an unlicensed band.

6. The WTRU of claim 1, wherein the first type of signal is associated with a reference signal (RS).

7. The WTRU of claim 1, wherein the first type of signal is associated with downlink control information (DCI) indicating that the channel has been acquired.

8. The WTRU of claim 1, wherein the first and second monitoring periods correspond to active periods of a discontinuous reception (DRX) cycle, and a time between an end of the first monitoring period and a start of the second monitoring period corresponds to a sleep period of the DRX cycle, and wherein the first time is determined based on a long DRX cycle configuration and the second time is determined based on a short DRX cycle configuration.

9. The WTRU of claim 1, wherein the first monitoring period corresponds to a first paging occasion and the second monitoring period corresponds to a second paging occasion.

10. The WTRU of claim 1, wherein the processor is further configured to:
activate a conditional paging occasion for a second paging occasion during the second monitoring period to monitor the channel based on not receiving the first type of signal.

11. The WTRU of claim 1, wherein the processor is configured to:
determine the first type of signal is an indication that indicates that the WTRU can go to sleep until a start of the second monitoring period based on a condition that the first type of signal is received and the second type of signal is not received during the first monitoring period.

12. The WTRU of claim 1, wherein the determination of the time associated with the start of the second monitoring period is further based on whether the second type of signal is received during the first monitoring period, and wherein if the first type of signal is received and the second type of signal is not received during the first monitoring period, the first time is determined for the start of the second monitoring period.

13. The WTRU of claim 1, wherein the determination of the time associated with the start of the second monitoring period is further based on whether the second type of signal is received during the first monitoring period, and wherein if neither the first type of signal nor the second type of signal is received during the first monitoring period, the second time is determined for the start of the second monitoring period, wherein the second time is earlier than the first time.

14. A method comprising:
monitoring a channel for a plurality of types of signals during a first monitoring period, wherein the plurality of types of signals comprises a first type of signal and a second type of signal, and wherein the first type of signal is associated with an indication that indicates the channel has been acquired, and wherein the second type of signal is associated with scheduling information for a transmission to or from a wireless transmit/receive unit (WTRU) on the channel;
determining a time associated with a start of a second monitoring period, wherein, the determination of the time associated with the start of the second monitoring period is based on whether the first type of signal is received during the first monitoring period, and wherein the determined time is a first time or a second time; and
determining a minimum duration associated with the second monitoring period, wherein:
if the first type of signal is received and the second type of signal is not received during the first monitoring period, a first duration is determined for the minimum duration; and
if neither the first type of signal nor the second type of signal is received during the first monitoring period, a second duration is determined for the minimum duration, wherein the first duration is longer than the second duration.

15. The method of claim 14, wherein if the first type of signal is received during the first monitoring period, the first time is determined for the start of the second monitoring period.

16. The method of claim 14, wherein if the first type of signal is not received during the first monitoring period, the second time is determined for the start of the second monitoring period, wherein the second time is earlier than the first time.

17. The method of claim 14, wherein the first and second monitoring periods correspond to active periods of a discontinuous reception (DRX) cycle, and a time between an end of the first monitoring period and a start of the second monitoring period corresponds to a sleep period of the DRX cycle, and wherein the first time is determined based on a long DRX cycle configuration and the second time is determined based on a short DRX cycle configuration.

18. The method of claim 14, further comprising, if the second type of signal is received during the first monitoring period, sending or receiving the transmission based on the scheduling information.

19. The method of claim 14, wherein the first monitoring period corresponds to a first paging occasion and the second monitoring period corresponds to a second paging occasion.

20. The method of claim 14, further comprising determining the first type of signal is an indication that indicates that the WTRU can go to sleep until a start of the second monitoring period based on a condition that the first type of signal is received and the second type of signal is not received during the first monitoring period.

* * * * *